US010943105B2

(12) United States Patent
Chen et al.

(10) Patent No.: US 10,943,105 B2
(45) Date of Patent: *Mar. 9, 2021

(54) DOCUMENT FIELD DETECTION AND PARSING

(71) Applicant: The Neat Company, Inc., Philadelphia, PA (US)

(72) Inventors: Shuo Chen, Livingston, NJ (US); Venkataraman Pranatharthiharan, Exton, PA (US)

(73) Assignee: The Neat Company, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/580,719

(22) Filed: Sep. 24, 2019

(65) Prior Publication Data

US 2020/0019768 A1  Jan. 16, 2020

Related U.S. Application Data

(63) Continuation of application No. 15/175,712, filed on Jun. 7, 2016, now Pat. No. 10,467,464.

(51) Int. Cl.
 G06K 9/46 (2006.01)
 G06K 9/00 (2006.01)

(52) U.S. Cl.
 CPC ..... G06K 9/00442 (2013.01); G06K 9/00449 (2013.01); G06K 9/46 (2013.01); G06K 2209/01 (2013.01)

(58) Field of Classification Search
 CPC .. G06K 9/00442; G06K 9/00449; G06K 9/46; G06K 2209/01
 See application file for complete search history.

(56) References Cited

U.S. PATENT DOCUMENTS

| 5,058,179 | A | * | 10/1991 | Denker | G06K 9/4628 |
| | | | | | 382/158 |
| 6,047,287 | A | * | 4/2000 | Caruana | G06F 17/17 |
| 6,097,834 | A | * | 8/2000 | Krouse | G06Q 20/04 |
| | | | | | 382/137 |
| 7,590,647 | B2 | * | 9/2009 | Srinivasan | G06F 40/177 |
| 8,249,344 | B2 | * | 8/2012 | Viola | G06F 40/211 |
| | | | | | 382/173 |

(Continued)

FOREIGN PATENT DOCUMENTS

WO  WO-2017214073 A1  12/2017

OTHER PUBLICATIONS

Extracting Relevant Named Entities for Automated Expense Reimbursement, Guangyu Zhu et al., ACM, 978-1-59593-609-7, 2007, pp. 1004-1012 (Year: 2007).*

(Continued)

*Primary Examiner* — Jayesh A Patel
(74) *Attorney, Agent, or Firm* — Culhane Meadows PLLC; Michael P. Dunnam

(57) ABSTRACT

A system and method for invoice field detection and parsing includes the steps of extracting character bounding blocks using optical character recognition (OCR) or digital character extraction (DCE), enhancing the image quality, analyzing the document layout based on imaging techniques, detecting the invoice field based on the machine learning techniques, and parsing the invoice field value based on the content information.

20 Claims, 34 Drawing Sheets

(56) References Cited

U.S. PATENT DOCUMENTS

| | | | |
|---|---|---|---|
| 8,705,836 B2 | 4/2014 | Gorski et al. | |
| 8,897,538 B1 | 11/2014 | Smith et al. | |
| 9,208,551 B2 | 12/2015 | Madhani et al. | |
| 2001/0051919 A1* | 12/2001 | Mason | G06Q 20/10 705/40 |
| 2002/0107794 A1* | 8/2002 | Furphy | G06Q 20/102 705/40 |
| 2003/0156215 A1* | 8/2003 | Chiu | H04N 5/23212 348/345 |
| 2003/0212617 A1* | 11/2003 | Stone | G06Q 40/12 705/30 |
| 2004/0210526 A1* | 10/2004 | Brown | G06Q 20/102 705/40 |
| 2005/0010474 A1* | 1/2005 | Desai | G06Q 20/102 705/14.69 |
| 2005/0063723 A1* | 3/2005 | Comstock | G11C 16/30 399/66 |
| 2005/0193327 A1 | 9/2005 | Chao et al. | |
| 2006/0242180 A1 | 10/2006 | Graf et al. | |
| 2006/0288268 A1 | 12/2006 | Srinivasan et al. | |
| 2007/0012759 A1* | 1/2007 | Allarea | G06Q 30/04 235/379 |
| 2007/0063050 A1 | 3/2007 | Attia et al. | |
| 2007/0271160 A1* | 11/2007 | Stone | G06Q 40/12 705/30 |
| 2008/0063264 A1 | 3/2008 | Porikli et al. | |
| 2008/0112013 A1 | 5/2008 | Ferlitsch et al. | |
| 2008/0144881 A1* | 6/2008 | Fortune | G06K 9/00449 382/100 |
| 2008/0219530 A1 | 9/2008 | Levanon et al. | |
| 2013/0085935 A1 | 4/2013 | Nepomniachtchi et al. | |
| 2013/0155474 A1* | 6/2013 | Roach | G06K 9/42 358/505 |
| 2013/0182002 A1 | 7/2013 | Macciola et al. | |
| 2014/0273928 A1* | 9/2014 | Dobbs | H04M 15/73 455/406 |
| 2014/0307959 A1 | 10/2014 | Filimonova et al. | |
| 2016/0171627 A1* | 6/2016 | Lyubarskiy | G06Q 40/12 705/30 |
| 2017/0351913 A1 | 12/2017 | Chen et al. | |

OTHER PUBLICATIONS

Extracting Relevant Named Entities for Automated Expense Reimbursement, Guangyu Zhu et al., ACM, 978-1-59593-609-7, Aug. 12-15, 2007, pp. 1004-1012 (Year: 2007).*

"U.S. Appl. No. 15/175,712, Advisory Action dated Jul. 13, 2018", 3 pgs.

"U.S. Appl. No. 15/175,712, Examiner Interview Summary dated Jun. 26, 2018", 4 pgs.

"U.S. Appl. No. 15/175,712, Final Office Action dated Apr. 4, 2018", 14 pgs.

"U.S. Appl. No. 15/175,712, Non Final Office Action dated Sep. 22, 2017".

"U.S. Appl. No. 15/175,712, Non Final Office Action dated Oct. 24, 2018", 28 pgs.

"U.S. Appl. No. 15/175,712, Notice of Allowance dated Jun. 19, 2019", 13 pgs.

"U.S. Appl. No. 15/175,712, Response filed Dec. 22, 2017 to Non Final Office Action dated Sep. 22, 2017", 18 pgs.

"U.S. Appl. No. 15/175,712, Response filed Jul. 2, 2018 to Final Office Action dated Apr. 4, 2018", 18 pgs.

"U.S. Appl. No. 15/175,712, Response filed Mar. 25, 2019 to Non Final Office Action dated Oct. 24, 2018", 21 pgs.

"International Application Serial No. PCT/US2017/036034, International Preliminary Report on Patentability dated Jul. 12, 2018", 15 pgs.

"International Application Serial No. PCT/US2017/036034, International Search Report dated Aug. 23, 2017", 4 pgs.

"International Application Serial No. PCT/US2017/036034, Written Opinion dated Aug. 23, 2017", 12 pgs.

Guangyu, Zhu, et al., "Extracting Relevant Named Entities for Automated Expense Reimbursement", ACM, 978-1-59593-609-7, (2007), 1004-1012.

* cited by examiner

DOCUMENT FIELD DETECTION AND PARSING

CLAIM OF PRIORITY

This application is a continuation of U.S. patent application Ser. No. 15/175,712, filed on Jun. 7, 2016, which is incorporated herein by reference in its entirety.

TECHNICAL FIELD

A document layout analysis and document content parsing system and method are described. In particular, an invoice parsing system and method is described that detects and locates the invoice fields from an input invoice and parses out the field values accordingly.

BACKGROUND

The invoice has become a very important financial document for businesses. Unfortunately, it is really challenging and time consuming to keep a good digital record of a pile of invoices by manually entering the metadata of the invoices. An automatic invoice parsing system that can automatically detect the invoice fields and parse out the corresponding field values therefore could significantly save time on manual data entry, as well as avoid any mistakes made by human input.

In a given invoice, the typical fields include vendor name, invoice number, account number, purchase order number, invoice date, due date, total amount, and invoice payment terms. The challenges of an invoice parsing system reside in the following three aspects:

(1) Input variations and noises: Different devices and methods produce different qualities. The size and the resolution of the input may vary significantly when using different devices. Besides the differences of devices, there are many other factors that will affect the quality of the input. The original invoice may be crumpled or incomplete. The capture environmental factors like lighting, skew, etc. may blur the image when it is captured by a mobile device. The dirt on the scanner mirror may introduce noise. Therefore, a robust method is needed that will work well in noisy environments.

(2) OCR/DCE errors: Optical Character Recognition (OCR) or Digital Character Extraction (DCE) is designed to extract characters from images or PDFs. The invoice field detection and parsing techniques described below primarily rely on those extracted characters. Unfortunately, no matter how good the quality of the input image or PDF is, OCR/DCE could cause noisy output. This causes difficulties to field detection and parsing. A simple keyword matching method cannot solve those difficulties. An improved method is desired.

(3) Invoice format variations: There is no unified standard format for invoices used in the business world. There are thousands of invoices with different formats used in day to day transactions. Some invoice fields are present in some invoices, but are not in others. The name of the invoice fields vary in many different ways too. Therefore, a simple template matching method cannot solve these variations.

SUMMARY

The system and method described herein provide an accurate and robust invoice parsing system that can addresses all of the challenges noted above. The system and methods include techniques of optical character recognition (OCR), image processing, document layout analysis, document understanding, and machine learning and provide a cloud based system that can accept invoices from different sources, process and parse those invoices, and show the parsed results on a web-based user interface.

In an exemplary embodiment, the methods include the primary steps of digital character extraction (DCE), image enhancement, OCR, document layout analysis, field detection, and field parsing. In particular, the method accepts invoice formats from different sources including BMP, PNG, JPEG, TIFF, searchable PDF, and non-searchable PDF. A format check is first performed, and if the input format is PDF, the Digital Character Extraction (DCE) workflow is then triggered to extract the image and character blocks, if there are any.

The next step in the process is image enhancement. The object of the image enhancement is to reduce the image noise, improve the image quality, and generalize the image format. In an exemplary embodiment, the image enhancement includes rotation, deskew, cropping, and background enhancement.

Optical Character Recognition (OCR) is then applied to extract the character blocks with coordinate information, if they are not extracted by the DCE process. The OCR usually works on images and non-searchable PDFs. Those character blocks will be then used in the document layout analysis.

The object of the document layout analysis (DLA) is to understand the layout of an input document and separate it into different zones. A typical invoice may contain logos, images, tables, text paragraphs, barcodes, and even handwritten notes. The DLA method implemented herein is purely based on image processing techniques. In an exemplary embodiment, the DLA method includes the primary steps of image binarization, image connected components extraction, noise removal, barcode extraction, table extraction, logo extraction, text character extraction, line generation, and zone generation. The following field detection and parsing will completely work on those document layout components.

Field detection searches and locates the field candidate across the document layout components. The system and method described herein present a cascade machine learning based field detection method to detect each respective field of the invoice. In an exemplary embodiment, the cascade field detection workflow includes "n" detectors for "n" fields—one detector per field. The fields include: invoice number detector, account number detector, purchase order number detector, invoice date detector, due date detector, invoice terms detector, total amount detector, and vendor detector. Each layout component will go through these detectors. If one of these field detectors identifies that one component belongs to the corresponding field, this component will then exit the cascade detection workflow and step into the field parsing workflow. Each field detector is a binary classifier that identifies whether the input component belongs to this field or not. The field detector includes an offline workflow and an online workflow. The offline workflow (training procedure) is used to train a classifier model. This model is then used in the online workflow (testing procedure) to classify each layout component. Both offline and online workflows have the steps of feature extraction and classification. There is a feature pool that includes various feature extraction methods, and a classifier pool that includes various classification methods. Each detector may select the optimal features and classifier for itself.

The object of the field parsing is to extract the value of each field candidate and to find the optimal value for the current field. The parsing method described herein is completely content based. Each field has its own parser: nevertheless, those parsers follow a similar procedure. In an exemplary embodiment, the field parser first searches the possible field values around the field candidate. If the current field candidate is inside a table cell, the search will be performed in the cell under the current one and the cell right next to the current one; if the current field candidate is inside a text line, the search will be performed in the current line, the line above the current one, the line under the current one, as well as the line right next to the current one. Once those value candidates are extracted, a field value validation process will be performed to screen out the false positives. Finally, an optimal value selection process will return the optimal field value for the current field.

BRIEF DESCRIPTION OF THE DRAWINGS

Exemplary embodiments are described below in conjunction with the associated figures, of which:

Figure 19A:
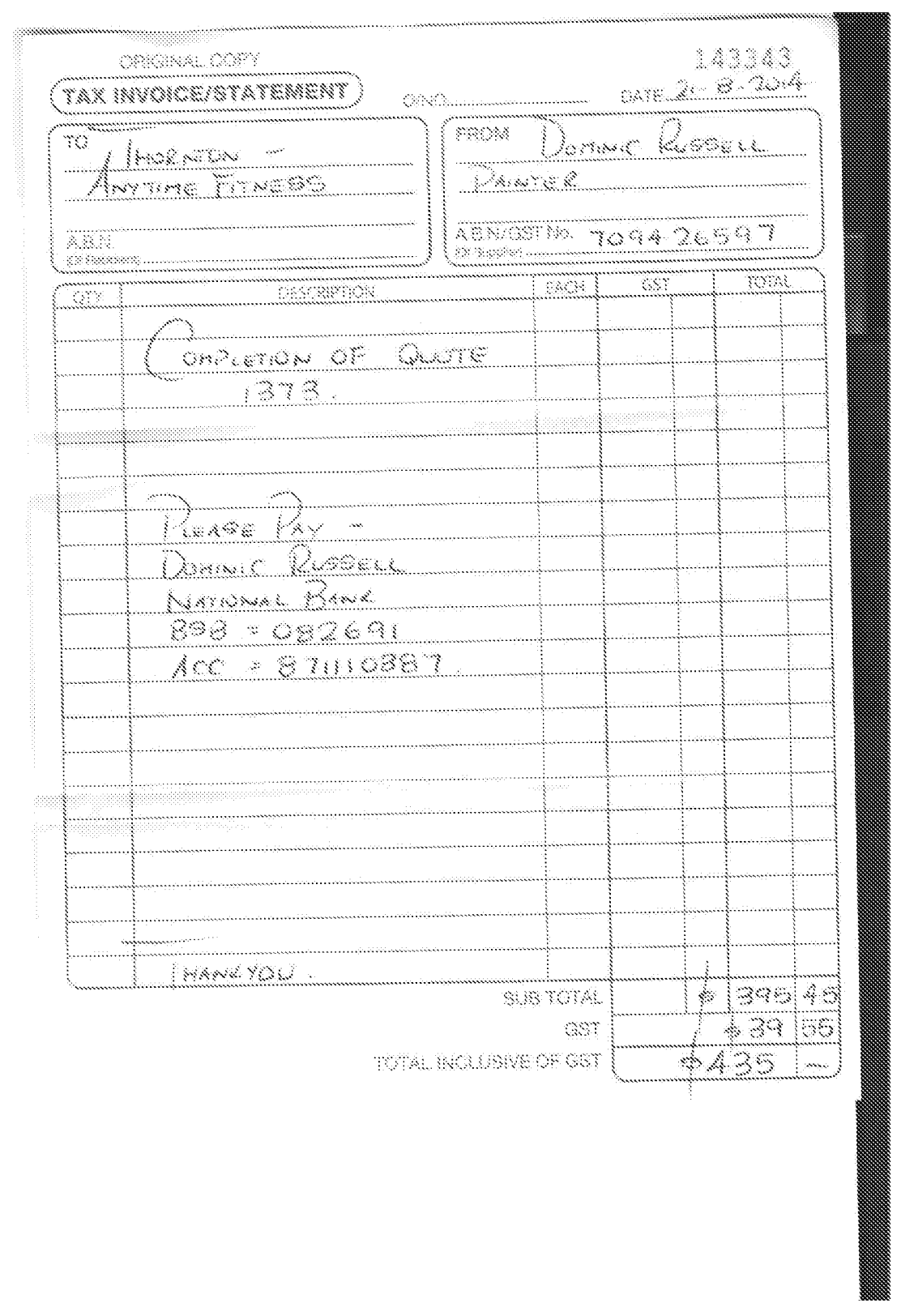
Figure 19B:
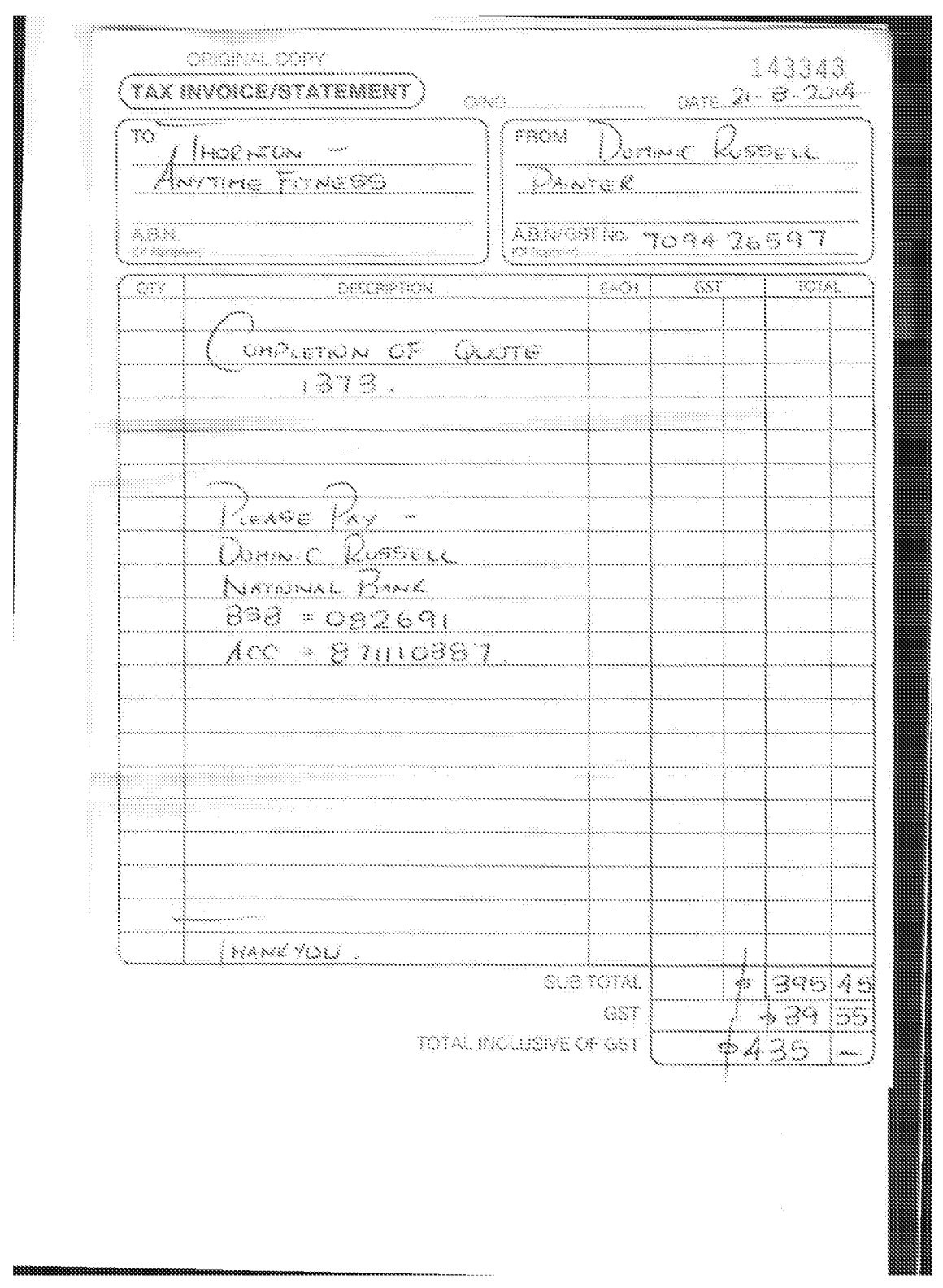
Figure 19C:
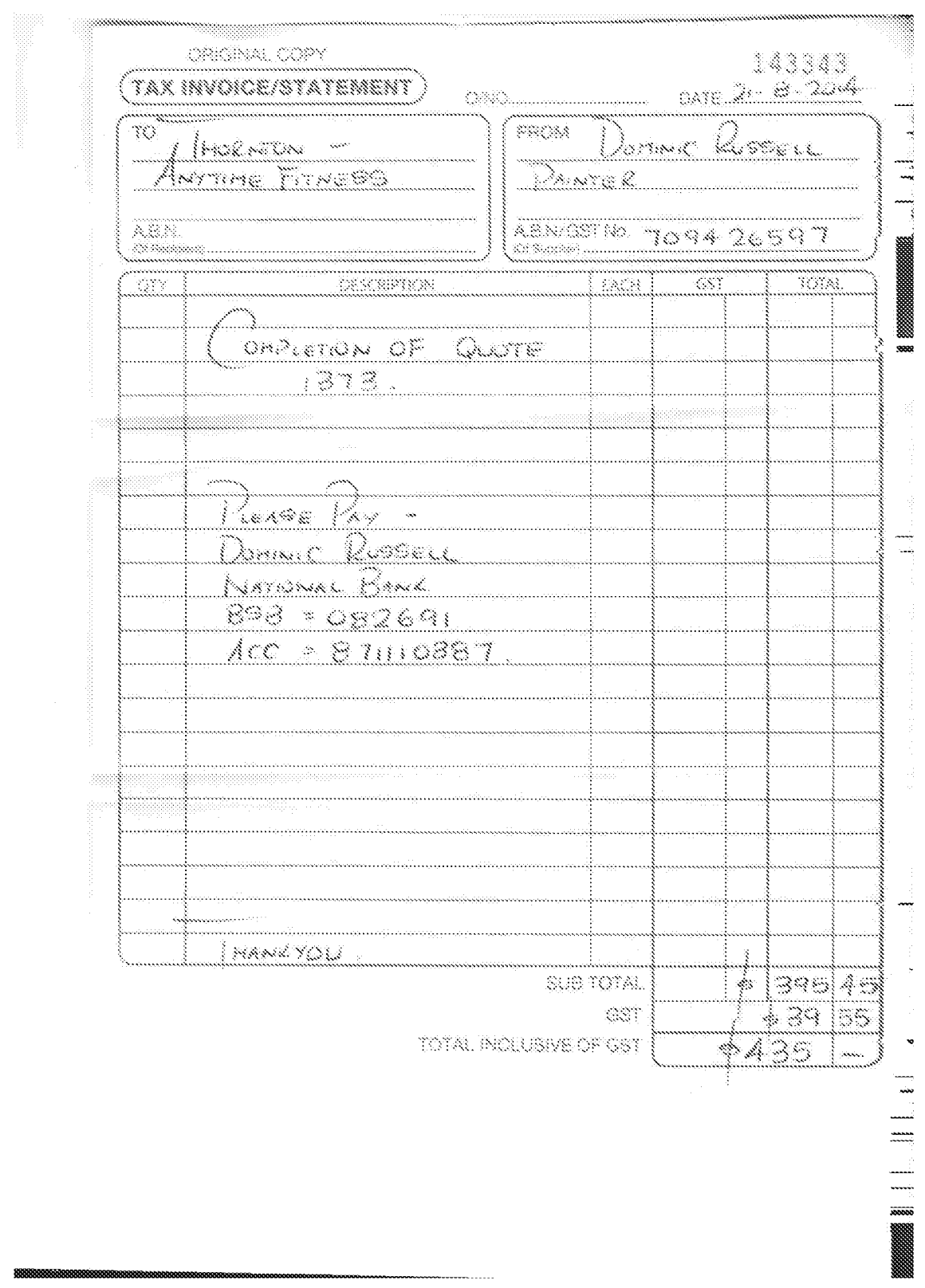
Figure 19D:
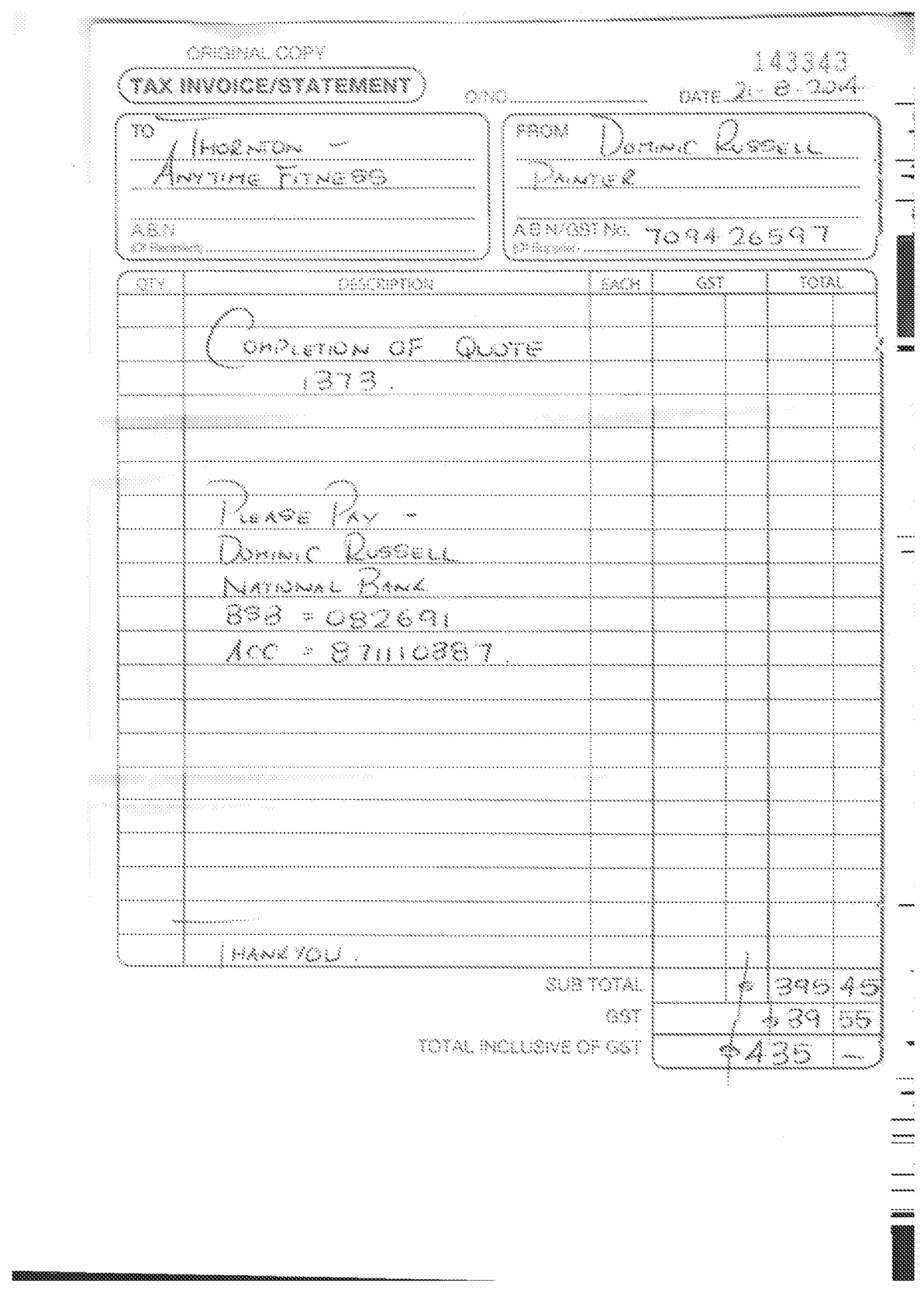

FIGS. 19(a), 19(b), 19(c), and 19(d) shows an image enhancement example where FIG. 19(a) is an original input image; FIG. 19(b) is the image after rotation and deskew; FIG. 19(c) is the image after cropping: and FIG. 19(d) is the final output image after background enhancement.

Figure 20C:
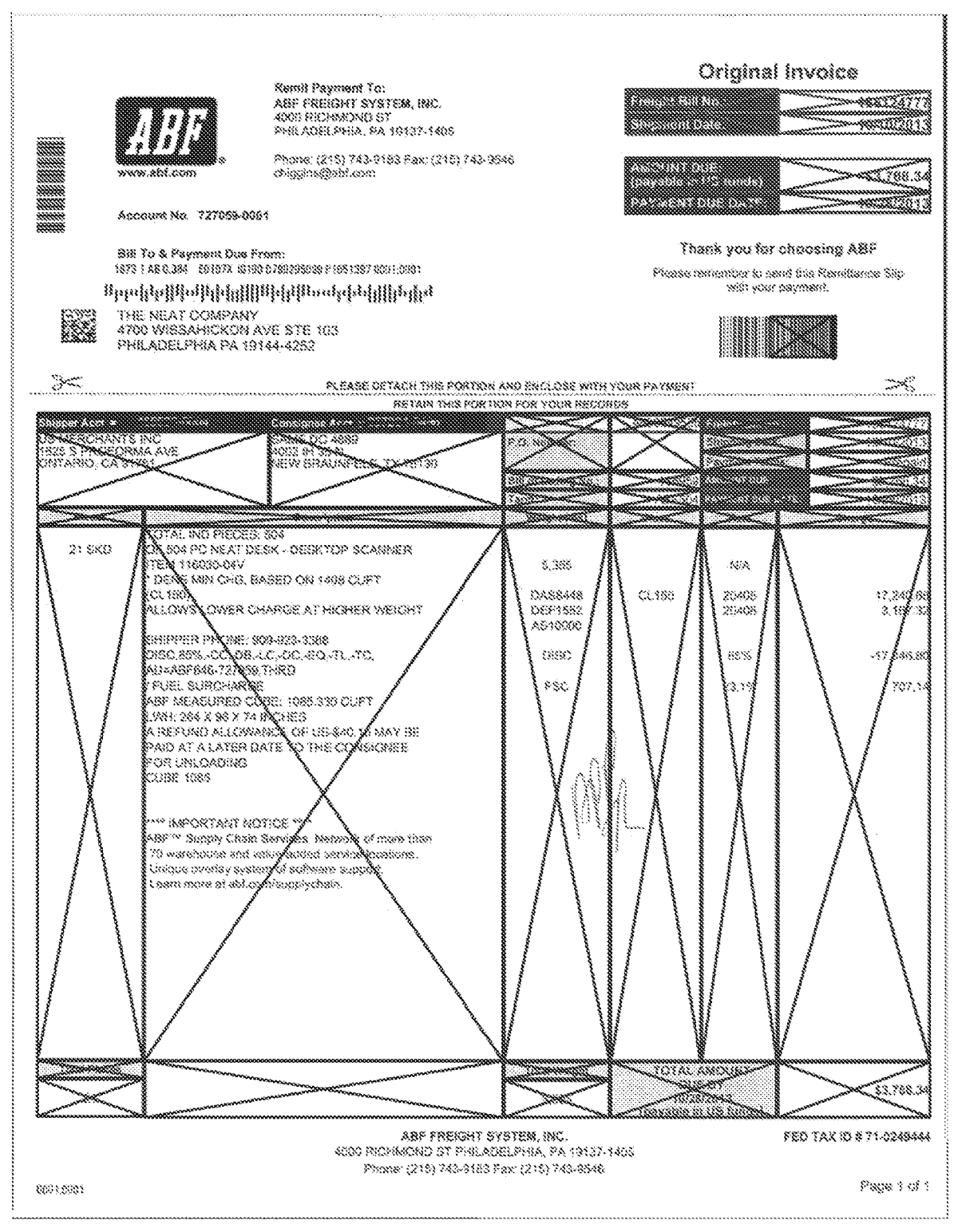
Figure 20F:
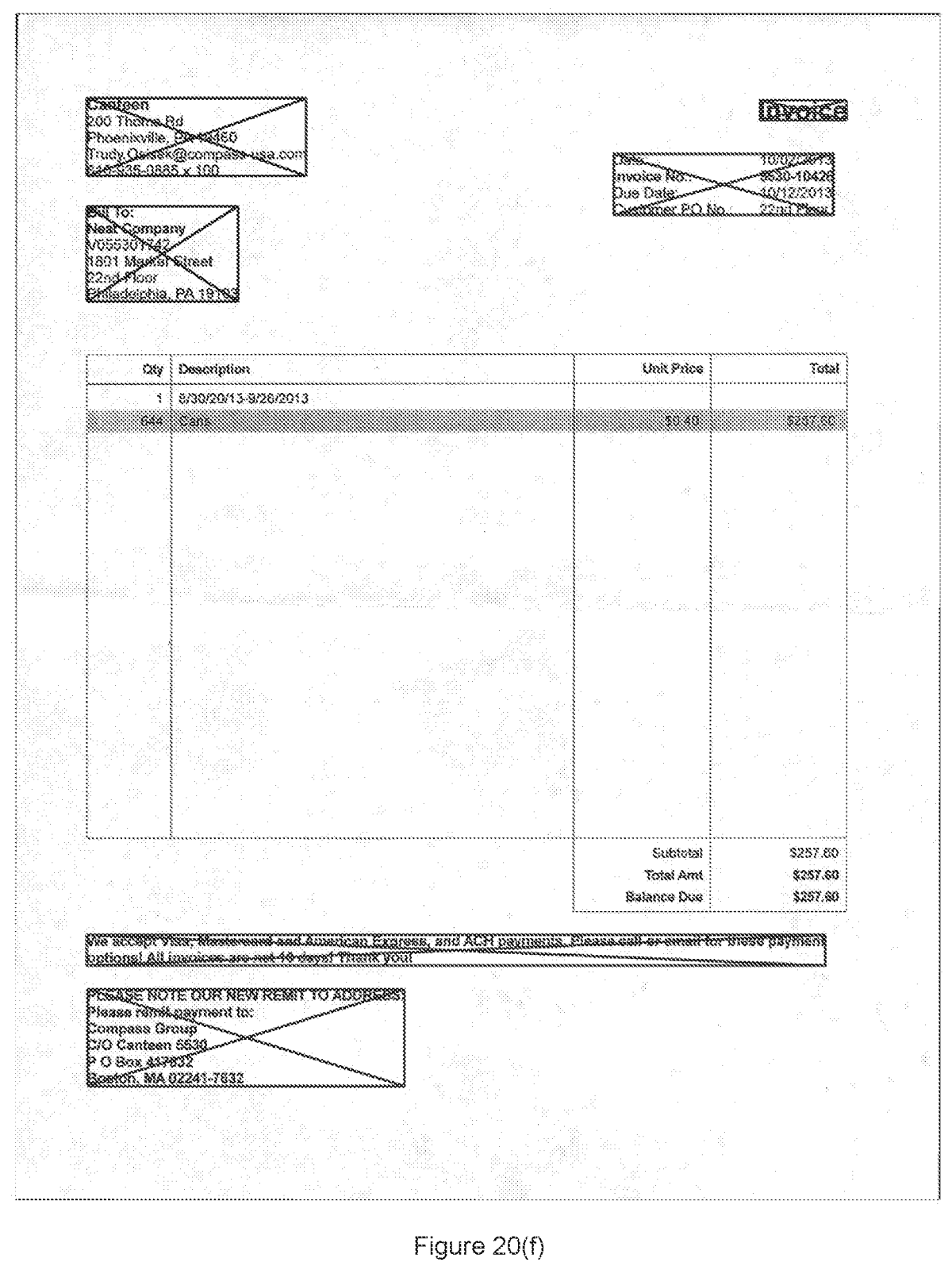

FIGS. 20(a), 20(b), 20(c), 20(d), 20(e), and 20(f) shows an image layout example where FIG. 20(a) shows an example of the barcode layout; FIG. 20(b) shows an example of the logo layout; FIG. 20(c) shows can example of the table layout: FIG. 20(d) shows an example of the character layout: FIG. 20(e) shows an example of the text line layout: and FIG. 20(f) shows an example of the paragraph zone layout.

FIGS. 22(a) and 22(b) shows an example of invoice number detection where FIG. 22(a) shows the input text line nodes and FIG. 22(b) shows the output detected invoice number text line node.

FIGS. 23(a) and 23(b) shows an example of how the field value is searched around the field tag % here FIG. 23(a) shows how the field value is searched when the field tag is inside a table cell and FIG. 23(b) shows how the field value is searched when the field tag is inside a text line.

DETAILED DESCRIPTION OF ILLUSTRATIVE EMBODIMENTS

Certain specific details are set forth in the following description with respect to FIGS. 1-23 to provide a thorough understanding of various embodiments of the invention. Certain well-known details are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

Figure 1:
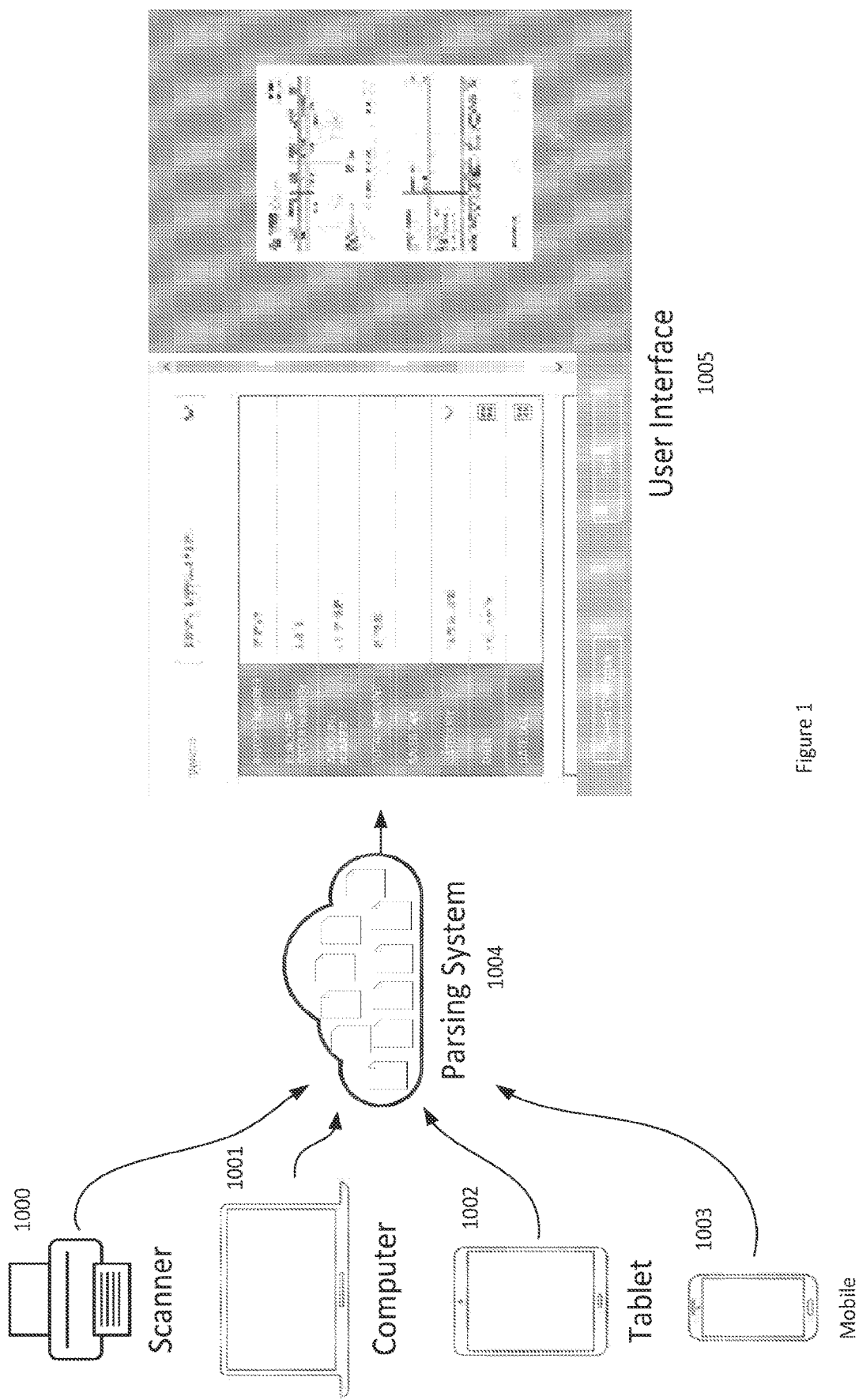
FIG. 1 shows an exemplary system architecture and user interface.

FIG. 1 shows the architecture of the invoice parsing system in an exemplary embodiment. As illustrated in FIG. 1, the system can accept invoices imported from different devices, like a photo copy scanned by a scanner (1000), a digital copy directed imported from a computer (1001), and a picture taken by mobile devices such as tablet (1002) or smart phone (1003). The invoices are then imported to the parsing system (1004). Once the system receives the imported invoices, the invoice parsing program is executed. Finally, the field values that are parsed out by the program will be shown on the user interface (1005).

Figure 2A:
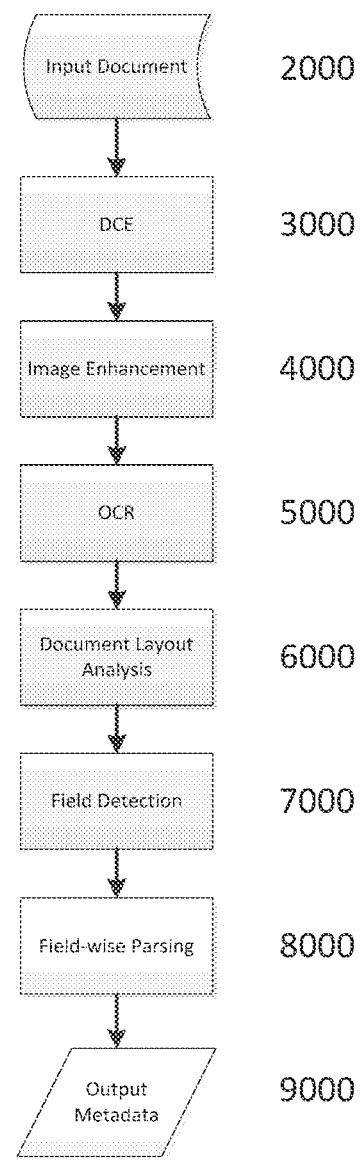
FIG. 2(a) shows a flowchart from the document input to the parsed field value output.
Figure 2B:
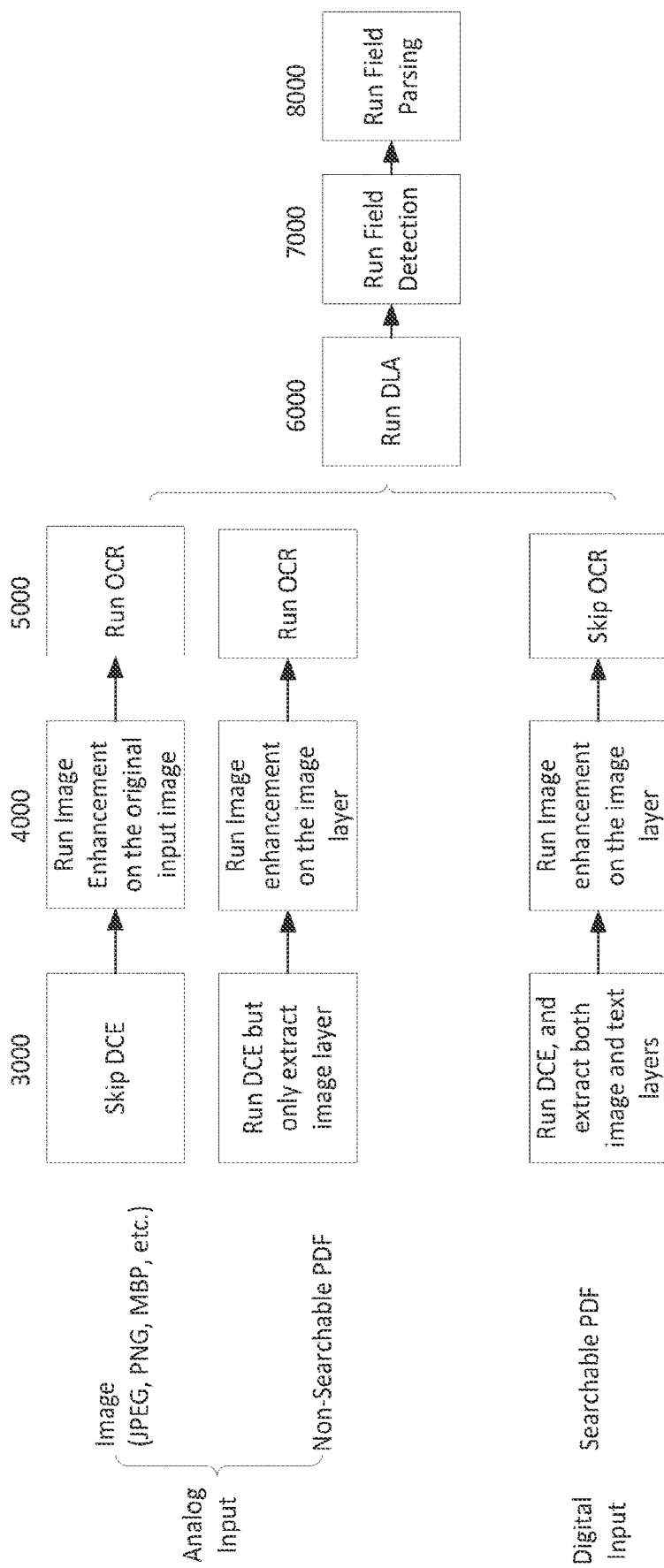
FIG. 2(b) shows the different processing of image and PDF inputs in the flowchart of FIG. 2(a).

FIG. 2(a) shows a flowchart of the invoice parsing method that is executed on a cloud server in an exemplary embodiment. As illustrated in FIG. 2(a), the method starts with the input document (2000) that is imported to the parsing system (1004). Digital Character Extraction (DCE) (3000) is then performed on the input document, as appropriate, to extract the image and text layers by extracting the character blocks, if applicable. For example, as shown in FIG. 2(b), when the input is a non-searchable PDF, the DCE extracts the image layer, while when the input is a searchable PDF, the DCE extracts both the image layer and the text layer. On the other hand, when the input is an image (e.g., JPEG, PNG, MBP, etc.), no DCE is performed. Image enhancement (4000) is then executed on the original input image or the image layer (in the case of PDF inputs) as shown in FIG. 2(*b*) to improve the image quality and to generalize the image format. Next, optical character recognition (OCR) (5000) is performed on the enhanced image to extract the character blocks, if they are not extracted by the DCE (3000) as in the case of the searchable PDF input (FIG. 2(*b*)). The document layout analysis (DLA) (6000) is then applied to the generalized image to extract the layout information. Once the layout information is extracted, field detection (7000) is performed on the layout to locate each field. Finally, the field-wise parsing (8000) is executed to extract the metadata of field value (9000) and to return it to the user interface (1005). These steps will be described in more detail below.

DCE (Step 3000, FIG. 2)

Figure 3:
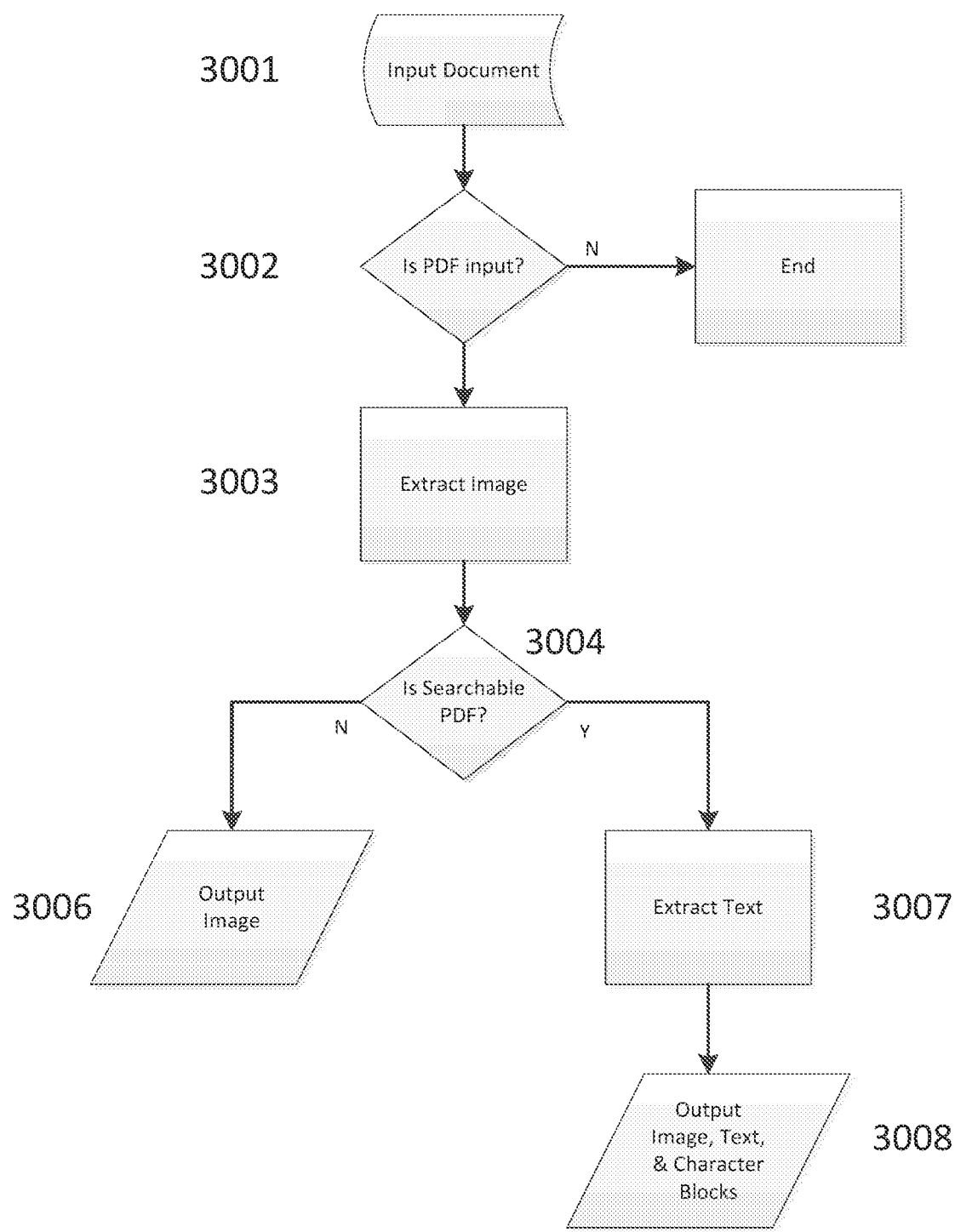
FIG. 3 shows a flowchart of the digital character extraction (DCE) that extracts the image and the character bounding blocks if applicable.

FIG. 3 shows a flowchart of the digital character extraction (DCE) that serves the PDF inputs only. There are two objects of this step: (1) to convert the input PDF into an image that will be used in the pure image-based layout analysis, and (2) to extract character blocks if the text is presented inside the PDF. There are two formats of PDFs—searchable PDF and non-searchable PDF. Searchable PDF is a combination of two layers—image layer and text layer. The image layer carries information including the actual image, resolution, compression method, color depth, etc. Similarly, the text layer includes the actual ASCII text and identification of the character's location on the page. By contrast, non-searchable PDF contains only an image layer but not a text layer.

As illustrated in FIG. 3, an input format check (3002) is first performed to check the file name extension to determine whether the input document (3001) is a PDF or not. If the input is not a PDF, nothing is executed and the DCE workflow comes to an end (3009). Otherwise, the DCE workflow will use a third party PDF processing engine to extract the image layer and, if applicable, the text layer. In particular, the DCE workflow first extracts the image layer (3003) from the input PDF using the PDF engine. The workflow then searches the text layer across the PDF to determine if it is a searchable PDF (3004). If the PDF is not searchable, the extracted output image (3006) will be saved and used in the image enhancement workflow (4000). If the PDF is searchable, the workflow will use the PDF engine again to extract all detectable character blocks with text and coordinate information (3007). Those character blocks (3008) will be output and used in the document layout analysis (6000).

Image Enhancement (Step 4000, FIG. 2)

Figure 4:
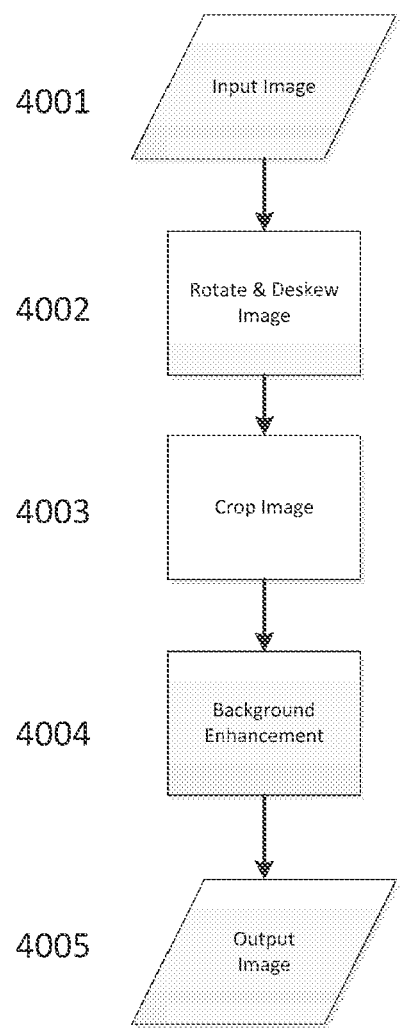
FIG. 4 shows a flowchart of the image enhancement that improves the image quality for following steps.

FIG. 4 shows a flowchart of the image enhancement that improves the image quality. As explained above, image variations and noises bring difficulties to optical character recognition (OCR) and document layout analysis (DLA). An image with low quality and high noise will significantly reduce the performance of the parsing system. The image variations include the size, the resolution, the skew angle, etc. The image noises may be caused various conditions, such as the lighting conditions when using a camera, the dirt on the scanner mirror, etc. The objective the image enhancement is to generalize those input image and reduce the image noises.

As illustrated in FIG. 4, given an input image (4001), this workflow starts with rotating or deskewing the input image (4002). The input image may be captured or scanned with different skew angle or even upside down. This will significantly affect the OCR accuracy. Given an invoice, the major components of the invoice will be text lines. Therefore, image-based line detection techniques are used to find out all the straight lines along with those text lines. To determine the rotation, the directions and the positions of those text lines are checked:

If a majority of those straight lines go horizontally and are formed along the bottom of its corresponding text line, the document is in portrait orientation and up straight. It thus does not need to be rotated;

If a majority of those straight lines go horizontally and are formed along the top of its corresponding text line, the document is in portrait orientation and upside down. It thus needs to be rotated 180 degrees clockwise;

If a majority of those straight lines go vertically and are formed along the left side of its corresponding text line, the document is in landscape orientation and rotated 90 degrees clockwise. It thus needs to be rotated 90 degrees counter-clockwise; and If a majority of those straight lines go vertically and are formed along the right side of its corresponding text line, the document is in landscape orientation and rotated 90 degrees counter-clockwise. It thus needs to be rotated 90 degrees clockwise.

Once the image is rotated to the portrait orientation with text up straight, the system needs to determine its skew angle from the horizontal line. The angle is measured by the difference in direction between the detected text line and the horizontal line. Once the angle is determined, the image is then rotated with respect to the angle so that the text line is parallel with the horizontal line.

A side effect of the image rotation and deskew is that it might create black areas along the boundary of the output image. Those black areas are used to patch the newly created empty space that is caused by the rotation or deskew operation. In addition, black margins are very likely to be present around the document boundary when the input document is scanned from a scanner. Those black areas or black margins may harm the performance of both OCR (5000) and image layout analysis (6000). In order to reduce or even eliminate those black areas and margins, the image enhancement workflow therefore performs the image cropping step (4003). This operation first converts the rotated image to a binary image and locates all the white connected components on this binary image. The biggest white connected component is then detected, and a minimum polygon is created around this white connected component. This polygon is assumed to be the boundary of the original input. The black connected components are then searched outside the boundary but along its edges. If a searched black connected component is bigger than a specific threshold, it will be refilled with the color of its nearest pixel that is inside the polygon. FIG. 19 shows an image enhancement example. FIG. 19(*a*) is the original input image with a slight skew to the left and a black margin along the right side. FIG. 19(*b*) shows the image after the rotation and deskew. Two newly added black margins are the side effect of the rotation operation and can be found around the left-top and bottom-left. FIG. 19(*c*) shows the image after cropping. The black margin on the left-top is eliminated and the black margin along the right side is significantly reduced.

The last step of the image enhancement workflow is background enhancement (4004). The background enhancement is designed to eliminate or to reduce the background noise so as to improve the performance of the OCR (5000)

and the image layout analysis (6000). Typical background noises include the shade caused by wrinkles, the shade caused by dirt or dusts, the faded color spot, etc. The background enhancement starts with computing the grayscale histogram of the input image. If the input image is a color image, the histogram is computed in each color channel respectively. Once the histogram is computed, the grayscale value with maximum count is searched across the histogram. Since a majority of the pixels of an input invoice are from the background, this grayscale value is considered the median grayscale value of the background. A grayscale interval is then created that is originated from above grayscale value and spread out to both the left and right directions. The length of the interval depends on the distribution of the histogram. Finally, all the background pixels are traversed. If the grayscale value of any pixel falls out of the grayscale interval, its grayscale vale is set as the minimum or maximum value of the interval depending on its relative place to the interval on the histogram. FIG. 19(*d*) shows the image after background enhancement. It is observed that the shades caused by wrinkles are relieved compared with FIG. 19(*c*). The output image is then provided to the OCR (4005).

OCR (Step 5000, FIG. 2)

Figure 5:
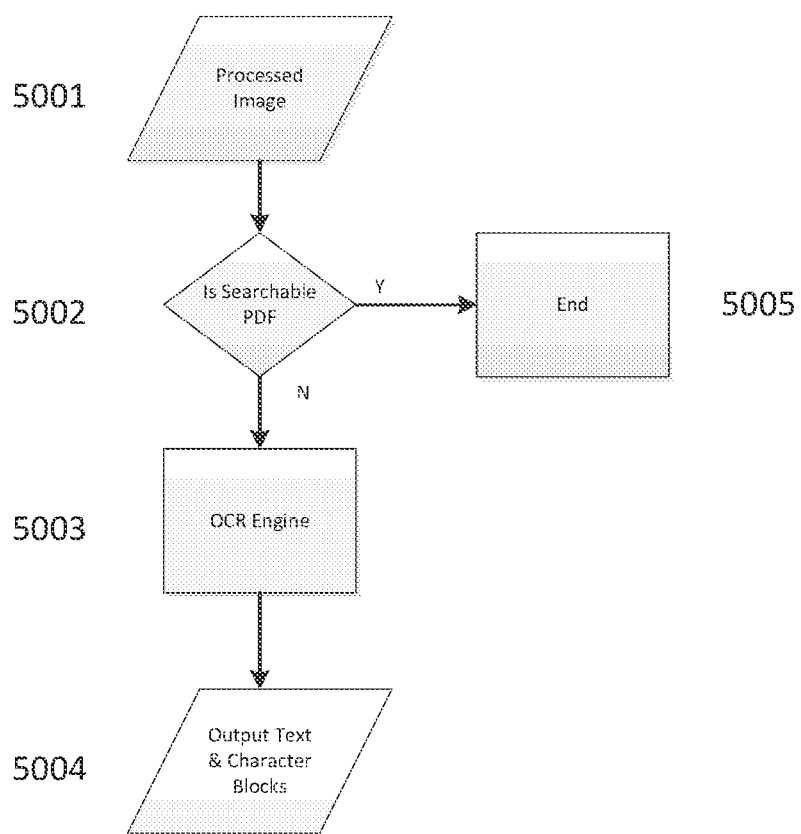
FIG. 5 shows a flowchart of the optical character recognition (OCR) that extracts the character bounding blocks if applicable.

FIG. 5 shows a flowchart of the OCR that is used to extract the text and character blocks. Each character block contains its corresponding character ASCII code and its location coordinate information. This location information will be further used in the document layout analysis (6000).

As illustrated in FIG. 5, given the processed image after image enhancement (5001), the OCR workflow starts with checking if the original input is a searchable PDF (5002). If it is a searchable PDF, the text and character blocks have been extracted in Step 3000, and this workflow comes to the end (5005). If the original input is not a searchable PDF, which means it might be a non-searchable PDF or an image, the workflow will apply a third party OCR engine (5003) to the processed image (5001), and extract and output the text and the character blocks (5004).

Document Layout Analysis (Step 6000, FIG. 2)

The goal of Document Layout Analysis (DLA) is to analyze the structure of an input document. A document, especially a document like an invoice, usually contains different sorts of components, such as logo, barcode, image, table, text paragraph, etc. Such component information will be very helpful for document understanding and metadata parsing. In an exemplary embodiment, the DLA output will be used by both the field detection (7000) and field-wise parsing (8000).

Figure 6:
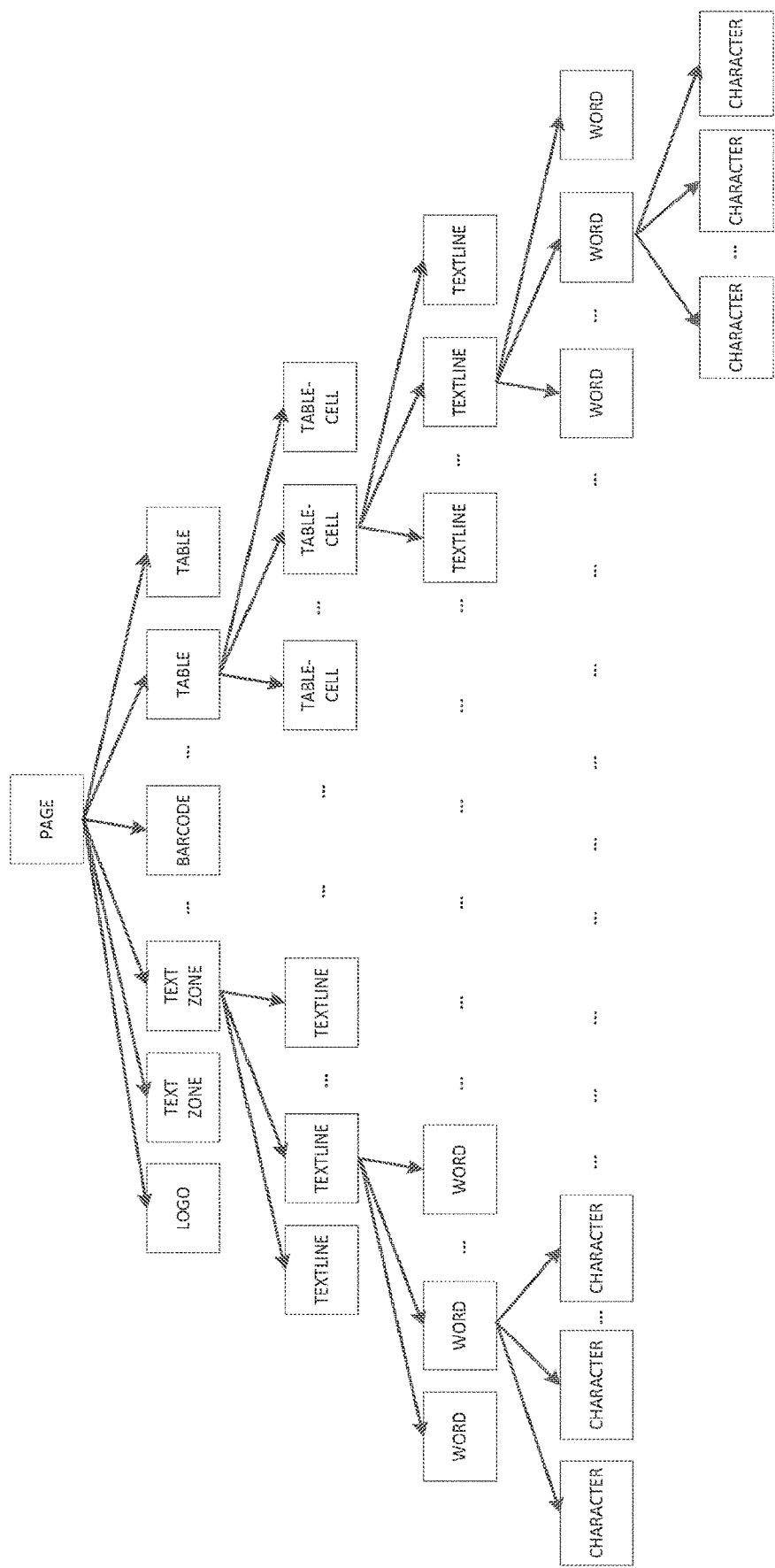
FIG. 6 shows a hierarchical tree structure that is used to store the document layout information.

Before describing the technique in detail, a data structure needs to be first defined in order to store the layout information. FIG. 6 shows the data structure that is used in an exemplary embodiment. As indicated in FIG. 6, the layout information is stored in a tree data structure. On the root level, there is only one node, which corresponds to the entire document page and stores the basic information about this page such as its width, height, etc.

A root node, or a page node, (6001) could have one or more descendant nodes. The nodes in this level correspond to different sorts of components in this page such as logo, barcode, table, text paragraph, etc. The respective nodes may include the following features:

The logo node (6002) may contain the logo image information and the text information if there is any. The image information may contain the size, the location coordinates, the color, etc. The text information may contain the text content, the font, the text size, the location coordinates, the color, etc.

The barcode node (6003) may contain the information of its location coordinates, the barcode size, the barcode color, and whether it is a horizontal or vertical one, etc.

The table node (6004) may contain the information about the table coordinates, the table size, the table grid information, as well as other table properties such as whether it is an inverse table, whether it is a single cell table, whether it is an open table, etc.

The text paragraph zone node (6005) may contain the information about the size of the paragraph zone, the location coordinates, the paragraph text content, etc.

Each table node (6004) has at least one descendant node, named table cell node (6004.1). This node corresponds to the cell inside a table. The table cell node (6004.1) may contain the information about the size of the table cell, the location coordinates, its relative order in the table, and some other cell properties such as the cell background color, the text color, the cell corner shape, the cell grid line information, etc.

Each table cell node (6004.1) or paragraph zone node (6005) also could have one or more descendant nodes, named text line node (6006). This node corresponds to the text line inside a paragraph zone or a table cell. The text line node (6006) may contain the information about the size of the text line, the location coordinates, the text content, the background color, the text color, etc.

Each text line node (6006) also could have one or more descendent nodes, named word node (6007). This node corresponds to the word inside a text line. The word node (6007) may contain the information about the size of the word, the locations coordinates, the text content, the background and text color, etc.

Each word node (6007) further could have one or more descendent nodes, named character node (6008). This node corresponds to the character inside a word, and is the smallest unit, i.e., leaf node, in the tree structure. The character node (6008) may contain the information about the size of the character, the locations coordinates, the character ASCII code, the background and foreground color, etc.

Figure 7:
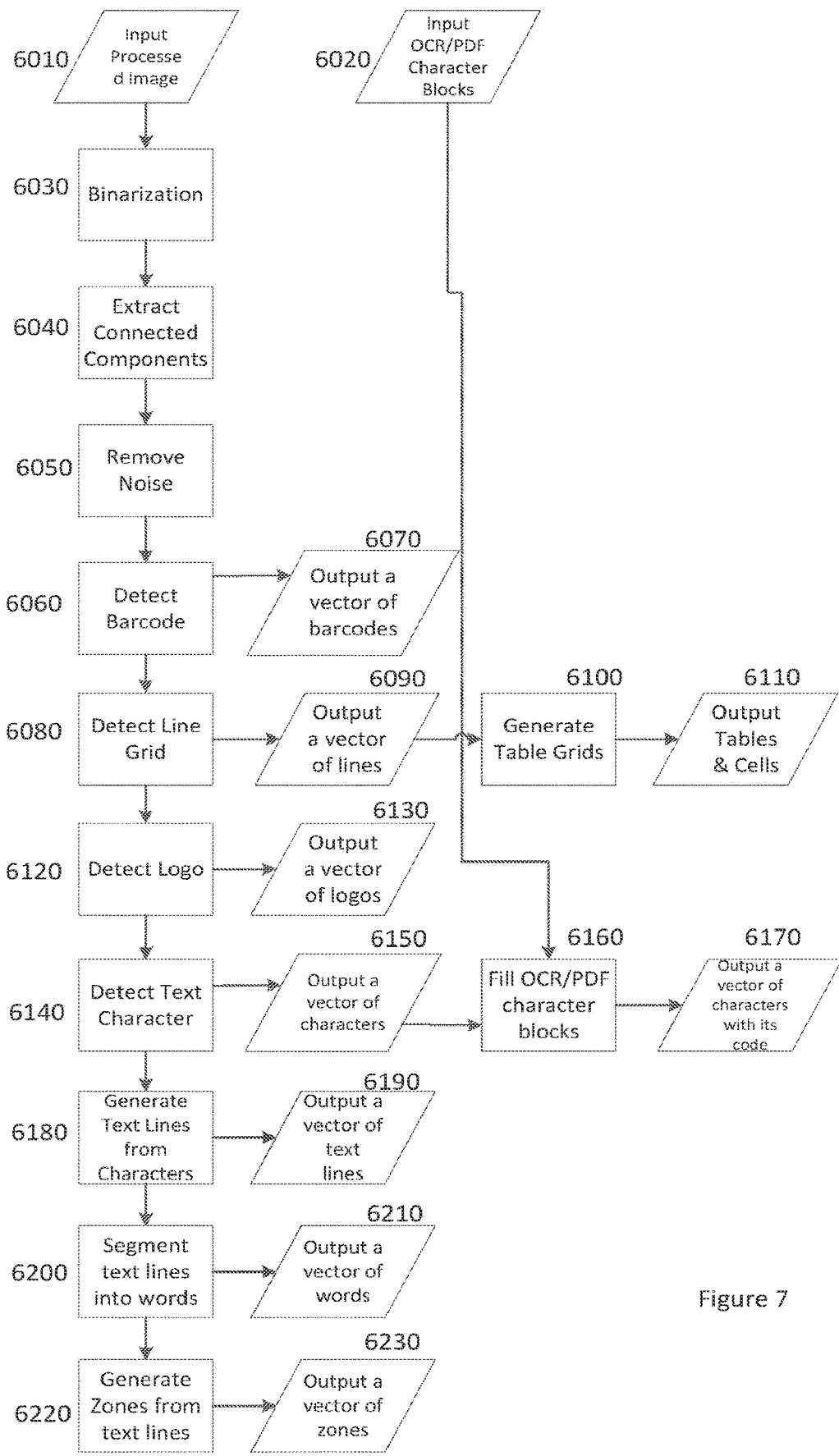
FIG. 7 shows a flowchart of the document layout analysis that extracts the document layouts from the fine-grained to the coarse-grained level.

FIG. 7 shows the workflow of the document layout analysis (6000). This workflow takes two inputs—one is the processed image after image enhancement (6010) and the other is the OCR/PDF character blocks (6020). The workflow starts with image binarization (6030) of the processed image (6010). The connected components are then extracted from the binary image (6040). A noise removal process (6050) is then executed in order to remove non-text, non-line, and non-image noises from the connected components. The cleaned connected components then enter the barcode detected process (6060) and the barcodes are first detected from the document, if there are any. The detected barcodes are saved as an output vector of barcode nodes (6070). The corresponding barcode connected components will be removed from the entire set of the connected components, and the rest will enter the next step—line extraction (6080). The connected components corresponding to each detection step will be removed from the entire set of the connected components after the current extraction process is complete, and only the remaining components will enter the next extraction process. The purpose of the line detection is to further detect and extract the table grids from the document. The line detection outputs a vector of lines (6090). The table grids are therefore generated upon those lines (6100), and a series of table nodes and table cell nodes are further generated upon those grids (6110). The rest of the connected components then will enter the logo detection process (6120). The logo detection process outputs a vector of logo nodes (6130).

At this point, all non-character connected components have been extracted, and the rest of all connect components will be considered character connected components. The character detection process (6140) collects those remaining connected components, organized them into characters and outputs a vector of character nodes (6150). As each of these character nodes contains its location coordinates, it is easy to fill its corresponding OCR/PDF character block (6020) with identical (or similar) location coordinates. The step 6160 then retrieves the character ASCII code from the OCR character block, fills it into the corresponding character node, and outputs a vector of character nodes, each filled with its ASCII code (6170). FIG. 20(*d*) shows an example of the character layout, in which the extracted characters are highlighted with rectangles.

Step 6180 then generates text lines based upon the character nodes, and outputs a vector of text line nodes (6190). Based up on the text lines, the step 6200 segments each text line into words and outputs a vector of word nodes (6210). The step 6220 groups the text lines into paragraph zones and outputs a vector of paragraph zone nodes (6230).

Image Noise Removal (Step 6050, FIG. 7)

Figure 8:
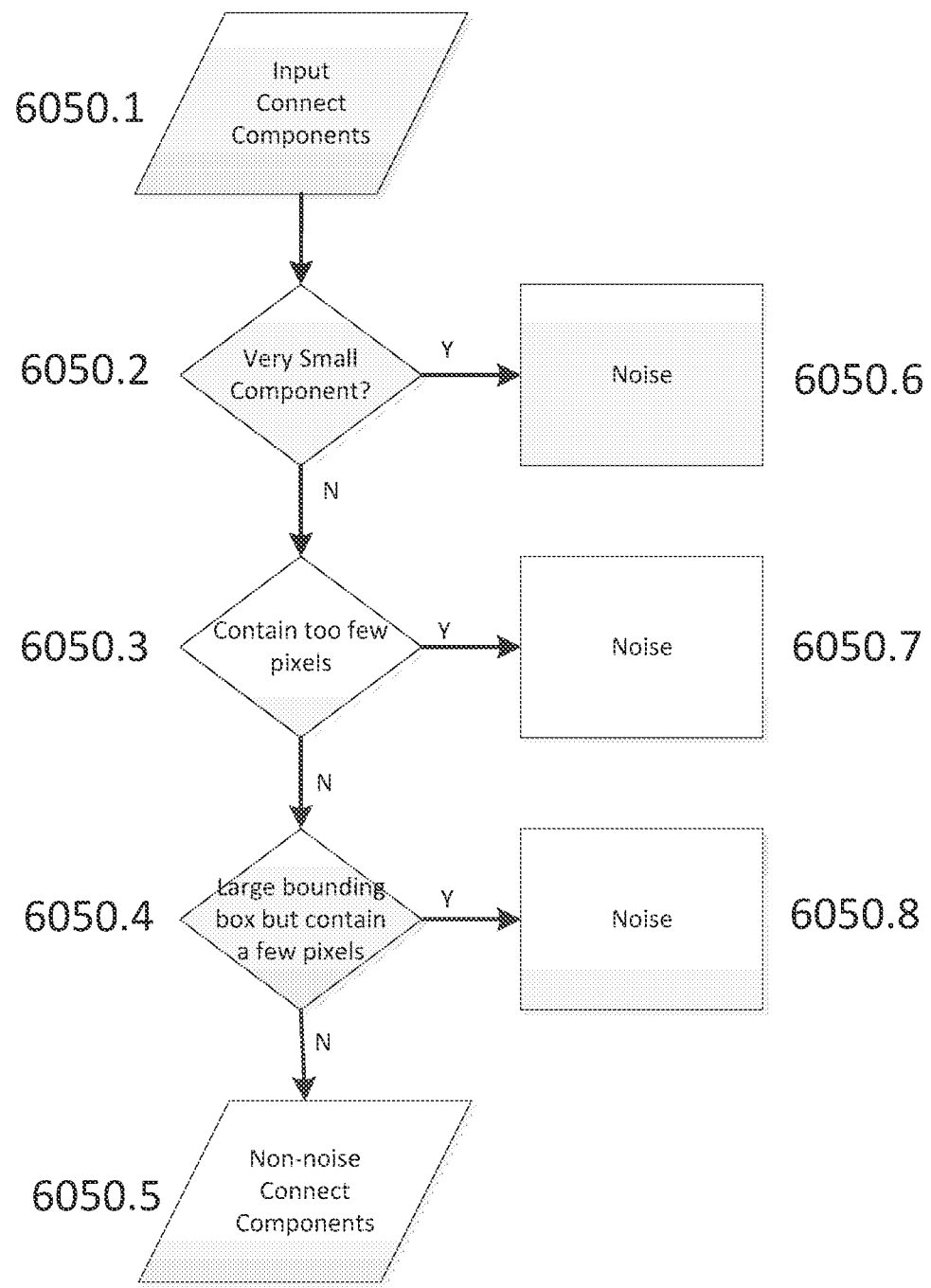
FIG. 8 shows a flowchart of removing image noise for the layout analysis.

FIG. 8 shows the detailed process of the image noise removal (6050). This process takes the connected components as input (6050.1). There are three sorts of connected components that are very likely to be noisy:

Very small connected components:
A connected component with extremely few pixels: and
A connected component with a large rectangular bounding box but a few pixels.

Therefore, the process starts with traversal of all the connected components. For each connected component:

If the size of the connected component is smaller than a threshold (6050.2), then it is considered noise and will be discarded (6050.6).

If the pixels that are contained by the connected component are less than a threshold (6050.3), then it is considered noise and will be discarded (6050.7).

If the size of the rectangular bounding box of the connected component is bigger than a threshold, and the number of its pixels is less than another threshold (6050.4), then it is considered noise and will be discarded (6050.8).

If the connected component does not fall into any of above categories, it is not considered noise and will be maintained for further processing (6050.5).

Barcode Detection (Step 6060, FIG. 7)

Figure 9:
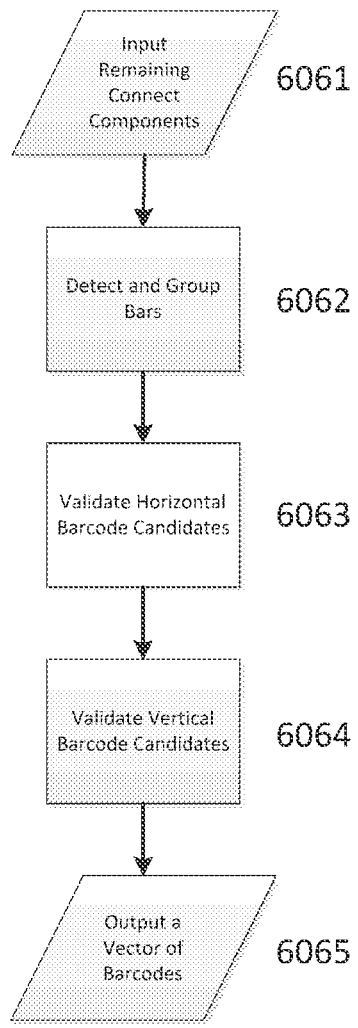
FIG. 9 shows a flowchart of detecting bars from the connected component images.

FIG. 9 shows the detailed process of barcode detection. This process takes the connected components as input (6061). The noise connected components have been removed in the previous step. The process starts with detecting and grouping bars (6062), followed by vertical bar group validation (6063) and horizontal bar group validation (6064). Finally, the detected bar groups that pass one of these validations are treated as final barcodes and saved in a vector of barcode nodes (6065). FIG. 20(*a*) shows an example of the barcode layout, in which the extracted barcode is highlighted with a rectangle.

Bar Detection and Grouping (Step 6062, FIG. 9)

Figure 10:
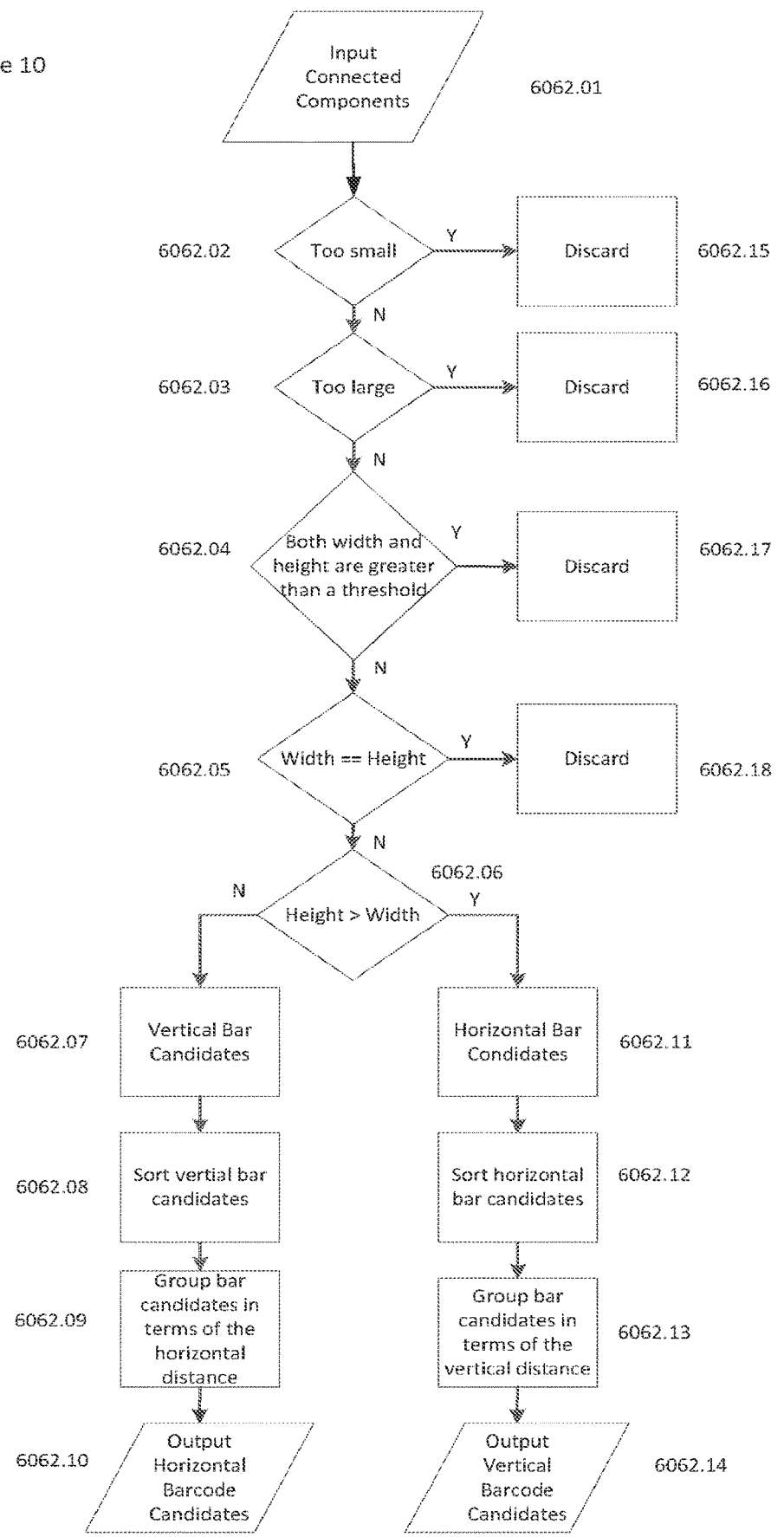
FIG. 10 shows a flowchart of detecting and grouping bars from connected components, which is the first step of barcode extraction.

FIG. 10 shows the detailed process of the barcode detection and grouping (6062). This process takes the connected components as input (6062.01). The process starts with traversal of all connected components. For each connected component:

With the assumption that a bar will not be too small, a size check is first performed. If the size of the connected component is less than a threshold (6062.02), then it is not treated as a bar candidate and will be discarded (6062.15);

With the assumption that a bar will not be too large, another size check is performed. If the size of the connected component is bigger than a threshold (6062.03), then it is not treated as a bar candidate and will be discarded (6062.16);

With the assumption that a bar is usually a horizontal or vertical stick-like rectangle, if both the width and the height of the connected component are bigger than a threshold (6062.04), then it is not treated as a bar candidate and will be discarded (6062.17);

With the assumption that a bar is usually a horizontal or vertical stick-like rectangle, if the width of the connected component is approximately equal to its height (6062.05), then it is not treated as a bar candidate and will be discarded (6062.18).

If the connected component passes all of the above checks, it will be treated as a bar candidate. If its height is greater than its width (6062.06), then it is treated as a vertical bar candidate and is inserted into the set of vertical bar candidates (6062.07); otherwise, it is treated as a horizontal bar candidate and is inserted into the set of horizontal bar candidates (6062.11).

The horizontal and vertical bar candidates then will be grouped for vertical barcodes and horizontal barcodes, respectively. A horizontal barcode comprises vertical bars, whereas a vertical barcode comprises horizontal bars. Since the grouping processes are similar with each other (6062.07-6062.10 for horizontal barcode candidates, whereas 6062.11-6062.14 for vertical barcode candidates), the following explanation will only address how the horizontal barcode candidates are formed. As illustrated, once all vertical bar candidates are detected at 6062.07, they are sorted based on their top left coordinates (6062.08). Next, the bar candidates with the horizontal distance between each other less than a threshold will be grouped together for a single horizontal barcode candidate (6062.09). Finally, a vector of all horizontal barcode candidates will be outputted (6062.10).

Barcode Validation (Step 6063 & 6064, FIG. 9)

Step 6062 outputs a vector of horizontal barcode candidates and a vector of vertical barcode candidates, respectively. Those barcode candidates need to be further validated to remove false positives. Since the horizontal barcode validation is similar with the vertical barcode validation, only how the vertical barcode validation is performed will be explained (6064, FIG. 9). It will be understood that the horizontal barcode validation (6063) is performed the same way.

Figure 11:
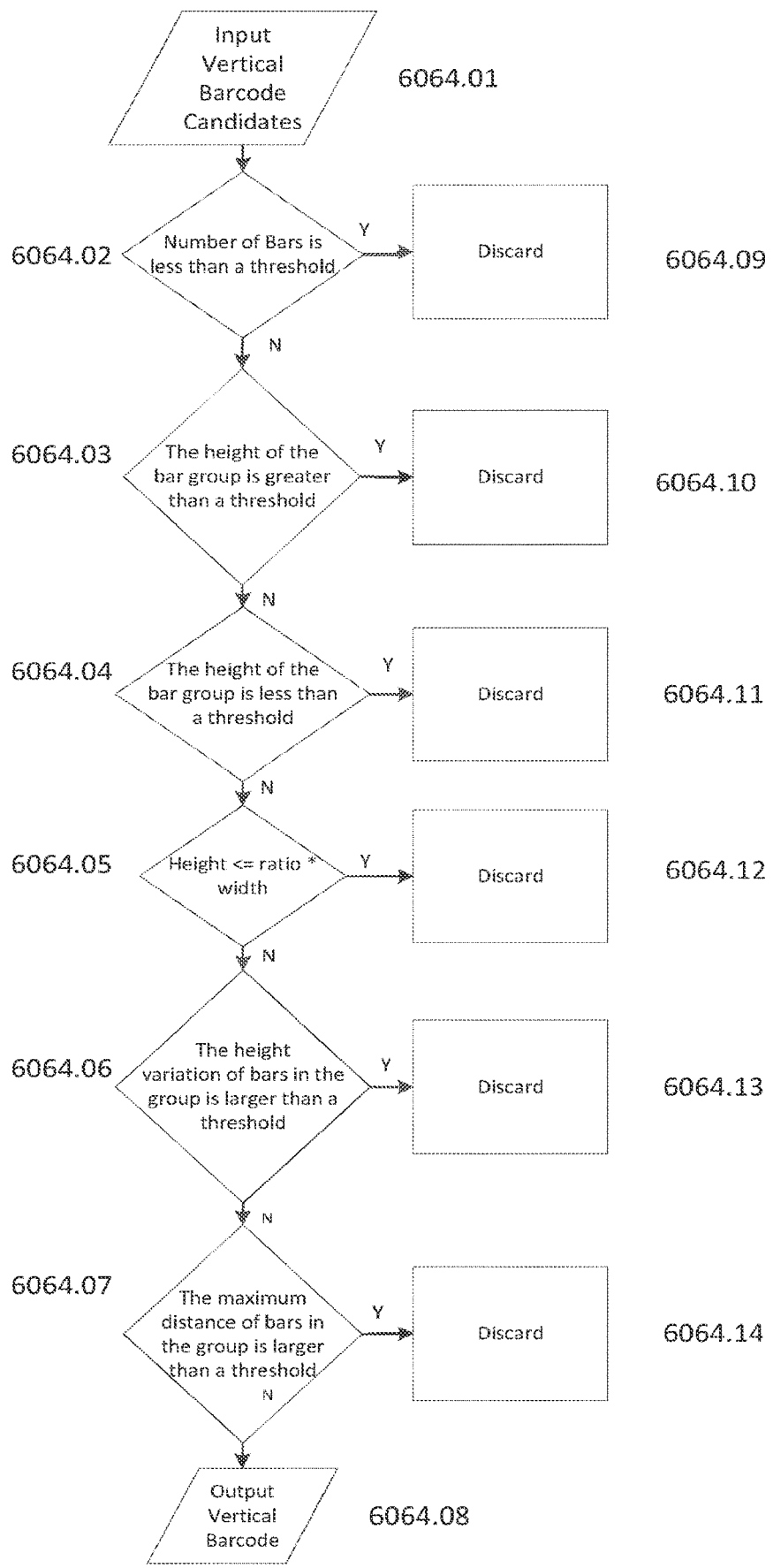
FIG. 11 shows a flowchart of validating those groups of bars that are extracted from FIG. 10, which is the second step of barcode extraction.

FIG. 11 shows the process of the vertical barcode validation. The process takes the vertical barcode candidates as the input (6064.01). For each vertical barcode candidate, the system:

With the assumption that a barcode should have a certain number of bars, if the number of bars inside the barcode is less than a threshold (6064.02), then it is not treated a real barcode and will be discarded (6064.09);

With the assumption that a vertical barcode should not be too high, if the height of the barcode candidate is bigger than a threshold (6064.03), then it is not treated as a real barcode and will be discarded (6064.10);

With the assumption that a vertical barcode should not be too small, if the height of the barcode candidate is smaller than a threshold (6064.04), then it is not treated as a real barcode and will be discarded (6064.11);

With the assumption that a vertical barcode should be shaped like a rectangle with the height greater than the width, if the height of the vertical barcode is less than a ratio times the width (6064.05), then it is not treated as a real barcode and will be discarded (6064.12);

With the assumption that the height of the bars inside a barcode should be equal or at least similar with each other, if the height variation among the bars inside the barcode is greater than a threshold (6064.06), then it is not treated as a real barcode and will be discarded (6064.13);

With the assumption that the bars inside a barcode should be close enough to each other, if the maximum distance of two bars inside the barcode is greater than a threshold (6064.07), then it is not treated as a real barcode and will be discarded (6064.14).

If a vertical barcode passes all above checks, it is finally treated as a real vertical barcode and is outputted as a barcode node (6064.08).

Table Detection (Step 6080-6110, FIG. 7)

Step 6080-6110 in FIG. 7 explains the line and table detection steps. Details of the table detection and extraction process may be found in commonly owned U.S. Pat. No. 8,625,895, incorporated herein by reference in its entirety. The detected table grids will be saved in the table related nodes and the corresponding connected components will be removed from the entire connected component set. FIG. 20(*c*) shows an example of the table layout in which the extracted table cells are highlighted with rectangles.

Logo Detection (Step 6120, FIG. 7)

Figure 12:
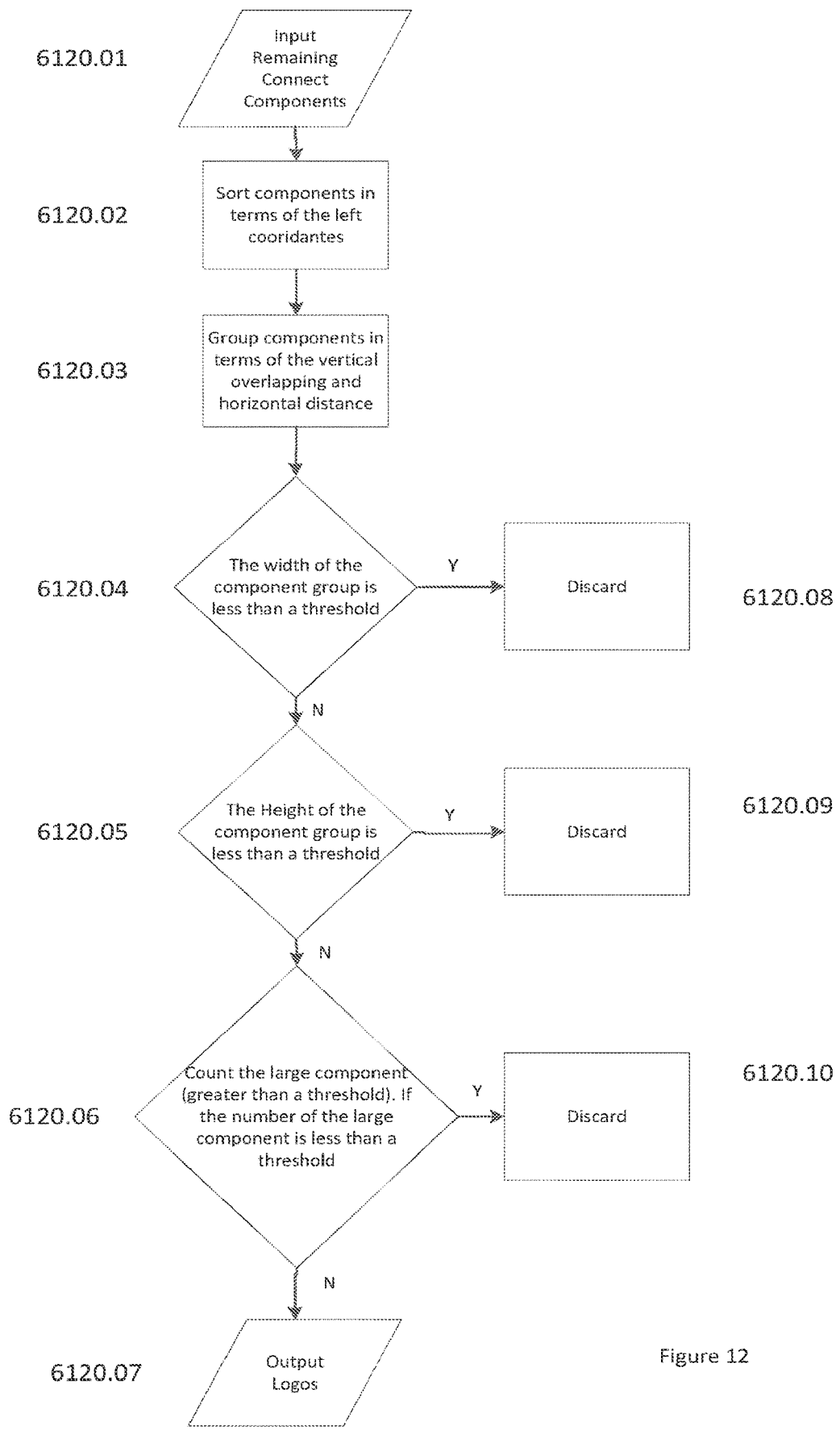
FIG. 12 shows a flowchart of detecting logos from the connected component images.

FIG. 12 shows the detailed process of logo detection. The process takes the connected components as inputs (6120.01). It starts with sorting those connected components in terms of the left coordinates (6120.02). A logo usually comprises several connected components. The next step is to group the connected components that may belong to a same logo image. The consecutive connected components will be grouped together if they meet the following two conditions (6120.03):

The overlapping vertical length of those two consecutive connected components is bigger than a threshold; and The horizontal distance of those two consecutive connected components is less than a threshold.

Next, those grouped connected components need to be validated to find the logo connected components. For each grouped connected component:

With the assumption that a logo is usually bigger than the normal text, if the width of the grouped connected component is less than a threshold (6120.04), it is not treated as a logo and will be discarded (6120.08):

With the assumption that a logo is usually bigger than the normal text, if the height of the grouped connected component is less than a threshold (6120.05), it is not treated as a logo and will be discarded (6120.09);

With the assumption that a logo is usually an image or includes little text, if the number of large connected components inside the grouped connected component is less than a threshold (6120.06), it is not treated as a logo and will be discarded (6120.10).

Finally, if a grouped connected component passes all of the above checks, it will be treated as a logo and outputted as a logo node (6120.07). FIG. 20(*b*) shows an example of the logo layout, in which the extracted logo is highlighted with a rectangle.

Text Line Generation (Step 6180, FIG. 7)

Figure 13:
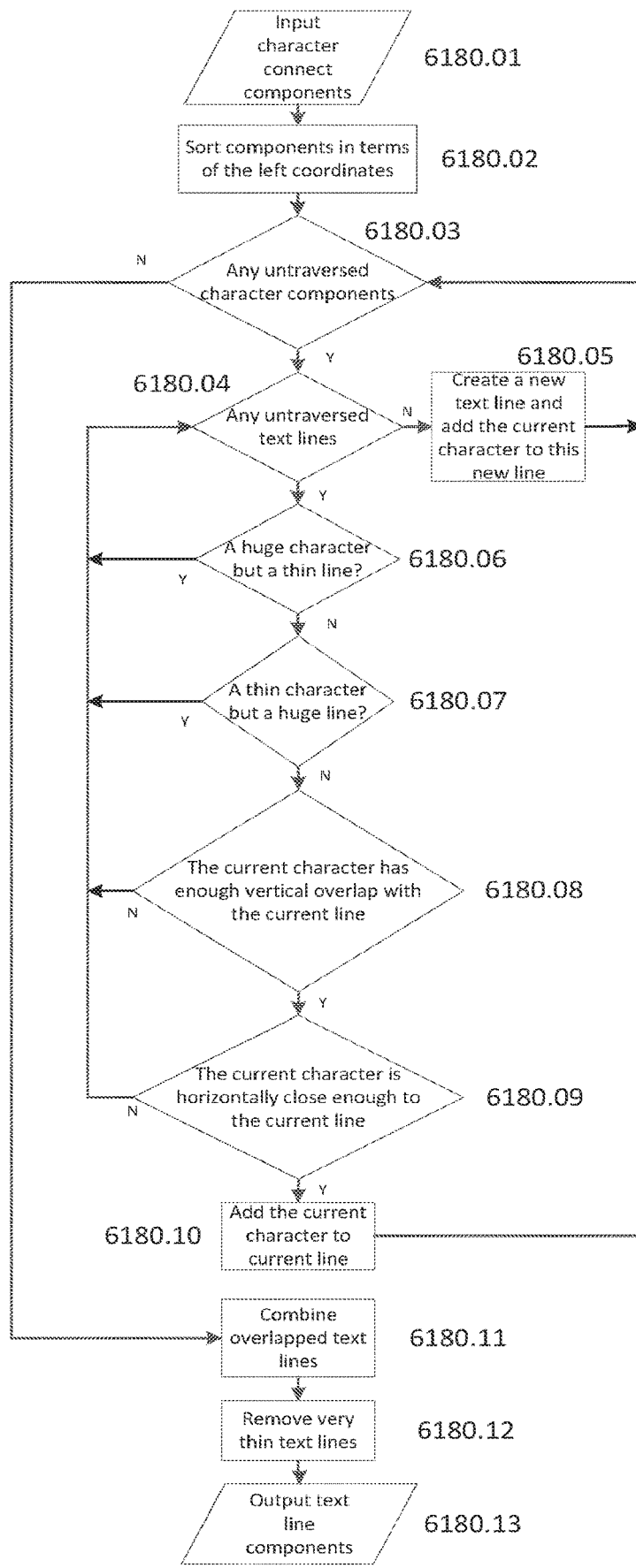
FIG. 13 shows a flowchart of generating and extracting text lines from the connected components that form characters.

FIG. 13 shows the detailed process of text line generation from characters (6180). The process takes the character nodes as input (6180.01) and starts by sorting those character nodes in terms of their left coordinates (6180.02) with respect to the top left corner. The process then traverses all of the sorted character nodes.

For each untraversed character node, the process searches among the existing text lines to find the matched one (6180.03):

For each untraversed existing text line, it will be compared with the current character node to determine if this character belongs to this text line (6180.04):

With the assumption that the current character should have the same font size with other characters in the same text line, if the height of the character is much bigger than the text line (6180.06), the current character will not be a part of the current text line, and the flow goes back to 6180.04;

With the same assumption, if the height of the character is much smaller than the text line (6180.07), the current character will not be a part of the current text line, and the flow goes back to 6180.04;

With the assumption that the current character should have sufficient vertical overlapping with the text line it belongs to, if the overlapping length is less than a threshold (6180.08), the current character will not be a part of the current text line, and the flow goes back to 6180.04;

With the assumption that the current character should be close enough to the text line it belongs to, if the horizontal distance between the current character and the current text line is bigger than a threshold (6180.09), the current character will not be a part of the current text line, and the flow goes back to 6180.04, If the current character passes all above checks, it belongs to the current text line, and will be added to the current text line (6180.10). The flow then goes back to 61080.03.

If all existing text lines have been traversed, and the current character does not belong to any of them, a new text line will be created and the current character will be added to this new text line (6180.05). The flow then goes back to 6180.03.

Once all character nodes are traversed, a set of text line candidates are generated. At this point, those candidates might include false positives or incomplete text lines. Therefore, a post-processing is desired in order to derive the real complete text lines. Step 6180.11 checks the consecutive text line candidates. If they have a certain horizontal overlapping, those text lines will be merged together and be treated as a single text line. In addition, with the assumption that the text line should be high enough to contain characters, if the height of a text line candidate is less than a threshold, it will not be treated as a real text line and will be removed from the candidates (6180.12).

Finally, the text line candidates pass above two checks are treated as the real text line and will be outputted as text line nodes (6180.13). FIG. 20(*e*) shows an example of the text line layout, in which the extracted text line nodes are highlighted with rectangles.

Word Generation (Step 6200, FIG. 7)

Figure 14:
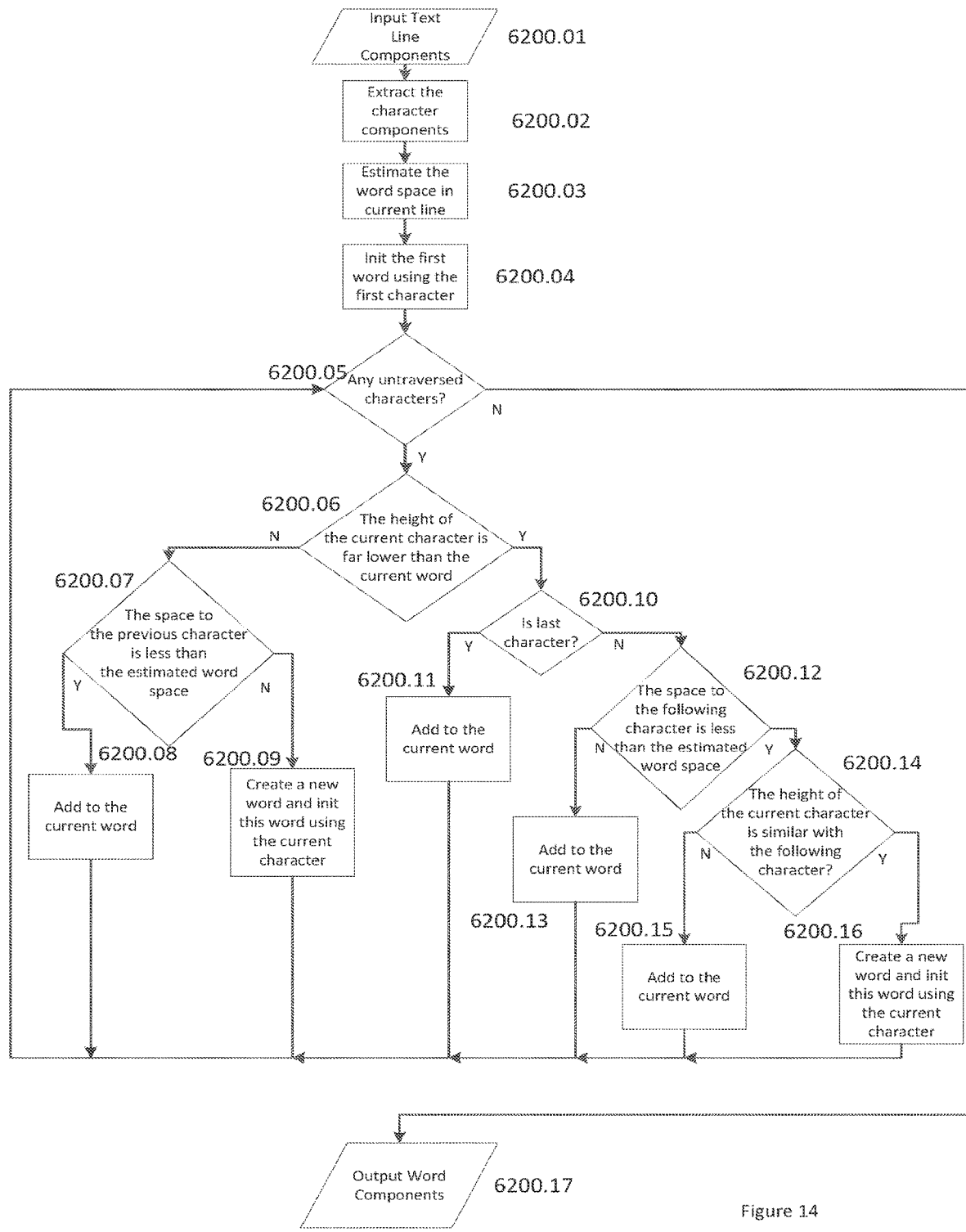
FIG. 14 shows a flowchart of segmenting and extracting words from the connected components that form text lines.

FIG. 14 shows the detailed process of word segmentation from the text line (6200). The process takes the text line nodes as the input (6200.01). For each text line node, the character nodes inside this line are first extracted (6200.02). The average distance between words in the current text line is then estimated (6200.03) as follows:

Calculate the horizontal distances between each pair of character nodes;

Remove the distance values that are less than a small threshold, which are treated as the distance between characters inside a word;

Remove the distance values that are bigger than a large threshold, which are treated as abnormal space inside a text line; and Calculate the average of the remaining distance values, which is treated as the estimated average distance between words.

The flow then initializes the first word using the first character of the current text line (6200.04). Next, the flow traverses all the characters of the current text line (6200.05). For each character:

Step 6200.06: with the assumption that the characters inside a word should have similar heights, a height difference check between the character and the current word is performed. If the height difference is less than a threshold, this character is more likely to belong to the current word, and the flow goes to step 6200.07; otherwise, it is less likely to belong to the current word, and the flow goes to step 6200.10.

Step 6200.07: with the assumption that the characters inside a word should be close enough to each other, a horizontal distance check between the character and the current word is performed. If the distance is less than the estimated average word distance that is computed in step 6200.03, this character is treated as belonging to the current word, and will be added to the current word (6200.08); otherwise, this character is not treated as belonging to the current word. The search on the current word ends. A new word is then created and is initialized with this current character (6200.09). This new word will be considered the current word.

Step 6200.10: with the assumption that the last word in a sentence is usually not a single character, if the current character is the last character in the text line, it will be treated as belonging to the current word, and will be added to the current word (6200.11); otherwise, the flow goes to step 6200.12.

Step 6200.12: with the assumption that the characters inside a word should be close enough to each other, a horizontal distance check between the current character and the following character is performed. If the distance is greater than the estimated average word distance, the current character is treated as belonging to the current word (not the one after it), and will be added to the current word (6200.13); otherwise, the flow goes to step 6200.14.

Step 6200.14: with the assumption that the characters inside a word should have similar heights, a height difference check between the current character and the following character is performed. If the height difference is greater than a threshold, the current character is treated to belong to the current word (not the one after it), and will be added to the current word (6200.15): otherwise, a new word is then created and is initialized with this current character (6200.16). This new word will be considered the current word.

Once all characters are traversed, all words in the current text line are formed upon the characters. Finally, this process outputs a vector of word nodes for each text line (6200.17).

Paragraph Zone Generation (Step 6220, FIG. 7)

Figure 15:
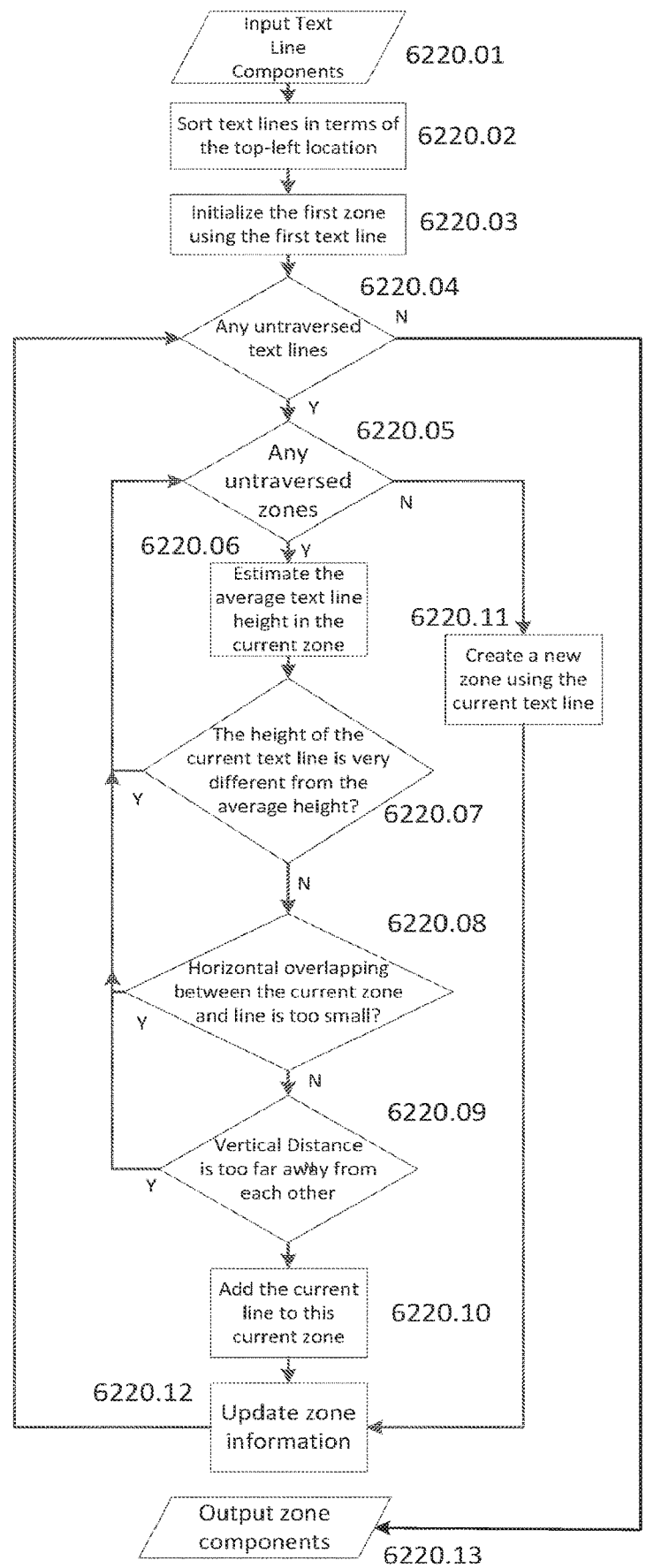
FIG. 15 shows a flowchart of generating and extracting zone or paragraphs from the connected components that form text lines.

FIG. 15 shows the detailed process of paragraph zone generation upon the text line. The process takes text line nodes as input (6220.01). The process first sorts those text line nodes in terms of their top-left coordinates (6220.02). Next, the first text line node is used to initialize the first paragraph zone (6220.03). The process then traverses all of the sorted text line nodes as follows.

For each untraversed text line node, the processes searches all existing paragraph zones to find the matched one (6220.04):

For each untraversed paragraph zone, the current text line will be compared with this zone to determine if this text line belongs to this zone (6220.05) as follows:

The process first estimates the average text line height in the current paragraph zone (6220.06).

With the assumption that the text lines in the same paragraph zone should have the same or similar height, if the difference between the current text height and the zone average text line height is larger than a threshold (6220.07), this text line is not treated to belong to this current zone, and the flow returns to step 6220.05.

With the assumption that the text lines in the same paragraph zone should be aligned overlapped on the horizontal direction, if the horizontal overlapping length between the current text line and the current paragraph zone is less than a threshold (6220.08), this text line is not treated to belong to this current zone, and the flow returns to step 6220.05.

With the assumption that the text line should not be very far away from other text lines in the same zone on the vertical direction, if the vertical distance between the current text line and the current zone is larger than a threshold (6220.09), this text line is not treated to belong to this current zone, and the flow returns to step 6220.05.

If the current text line passes all of the above checks, it is treated to belong to the current paragraph zone, and will be added to this zone (6220.10). The zone information is then updated with the newly added text line (6220.12), and the flow returns to step 6220.04.

If all existing paragraph zones are traversed, but the matched zone is not found yet, a new paragraph zone is created and initialized with the current text line (6220.11). The flow then goes to step 6220.12 to update the new zone information, and the flow then returns to step 6220.04.

Once all text line nodes are all traversed, the paragraph zones inside the current document are all created, and every text line is assigned to a paragraph zone. Finally, the process outputs a vector of paragraph zone nodes (6220.13). FIG. 20(*f*) shows an example of the paragraph zone layout, in which the extracted paragraph zones are highlighted with rectangles.

Field Detection and Parsing (Steps 7000 & 8000, FIG. 2)

Figure 16:
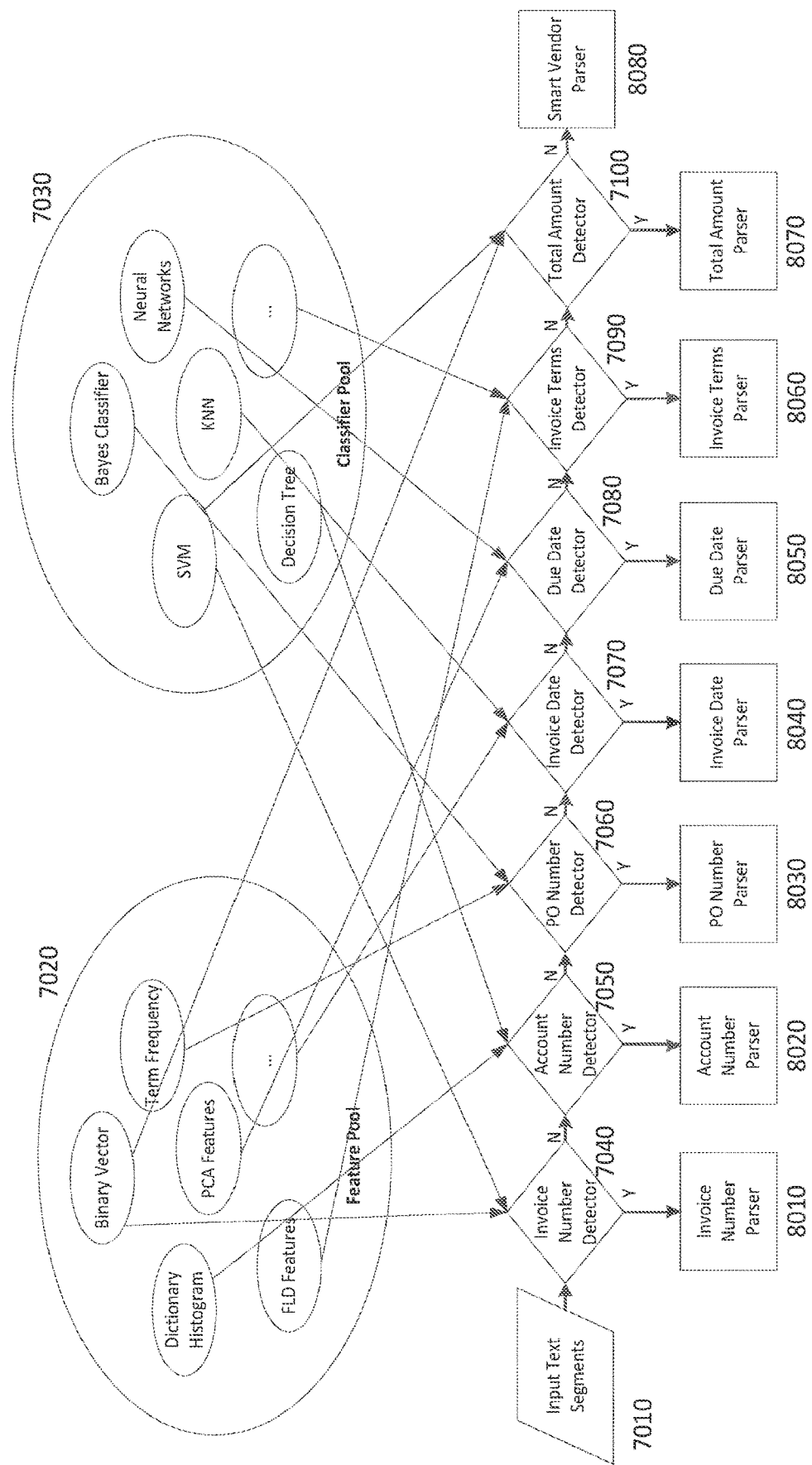
FIG. 16 shows a flowchart of the invoice field parsing that takes the text line layout as input and outputs the field name and its value, mainly containing two features—the machine learning based (ML-based) field detector and the content-based field parser.

FIG. 16 shows the detailed parsing workflow, which further includes a field detection process and a field parsing process. In the exemplary embodiment, the fundamental field detection architecture is a cascade binary classifier. Each invoice field corresponds to a field detector. Those field detectors are independent from each other, and each performs a binary classification on the input to determine whether the input is the corresponding field candidate or not. If the input is detected as a candidate for the current field, it will enter the corresponding field parser; otherwise, the input will enter to another field detector, and so on so forth. The benefits of the cascade field detection architecture are:

Flexibility: Each detector is independent from others so that it can find the optimal settings for itself. As shown in FIG. 16, a detector includes two principal components—feature extraction and classification. In the exemplary embodiment, a feature pool (7020) and a classifier pool (7030) are maintained. The feature pool includes a bunch of state-of-the-art feature extraction methods that are widely used in lexical feature extraction, such as term frequency features, dictionary histogram features, binary features, etc. There are still two sorts of features shown in step 7020—principal component analysis (PCA) features and linear discriminant analysis (LDA) features. Those two kinds of features are used to reduce the dimensionality of the original features as well as to improve the discriminant ability. The classifier pool includes a bunch of state-of-the-art classification models, such as support vector machine (SVM), neural networks (NN), Bayes classifier, etc. Each field detector can figure out the optimal combinations with optimal settings.

Reusability: Even though the detectors are independent from each other, they share a feature pool and a classifier pool. From the software development perspective, once those feature extraction methods and classification methods are implemented, they can be re-used by different detectors. In a special case, if two detectors have the same optimal combinations, the whole detector implementation can be used by another.

Extensibility: Since the detectors are independent from each other, updating one detector will not affect others. Therefore, if better solutions are found for a specific detector, that detector may be updated without touching others.

FIG. 16 shows an exemplary embodiment of the parsing workflow. As shown in FIG. 16, the process takes the text line nodes as input (7010). For each text line node, it is first detected whether it contains an invoice number field tag (7040). The invoice number detector has been pre-trained offline with the optimal combination of feature extraction (7020) and classification model (7030). If the text line is detected as an invoice number candidate, it will enter the invoice number parser (8010), and this text line node is then removed from the entire set of the text line nodes that are waiting for detection and parsing.

If the text line is not detected as an invoice number candidate, it will enter the account number detector (7050), and repeat the similar steps as performed by the invoice number detector and parser, entering the account number parser (8020).

Analogously, a text line node will run through the invoice number detector (7040), the account number detector (7050), the purchase order number detector (7060), the invoice date detector (7070), the due date detector (7080), the invoice terms detector (7090), and the total amount detector (7100) until it is detected as a candidate of a specific field and sent to its corresponding parser (8010-8080). If a text line node is not detected as a candidate of any of above fields, it is considered to not include any field tags and will be ignored.

Those skilled in the art will appreciate that the detectors of FIG. 16 are independent from each other and that the ordering of the detectors in FIG. 16 is merely exemplary. The detectors may be arranged in different configurations as appropriate. The text line nodes will advance through the chain of detectors until either a detector identifies the text line node as a candidate, or it passes through all detectors without being detected as a candidate.

ML-Based Field Detection (Step 7040-7100, FIG. 16)

Figure 17:
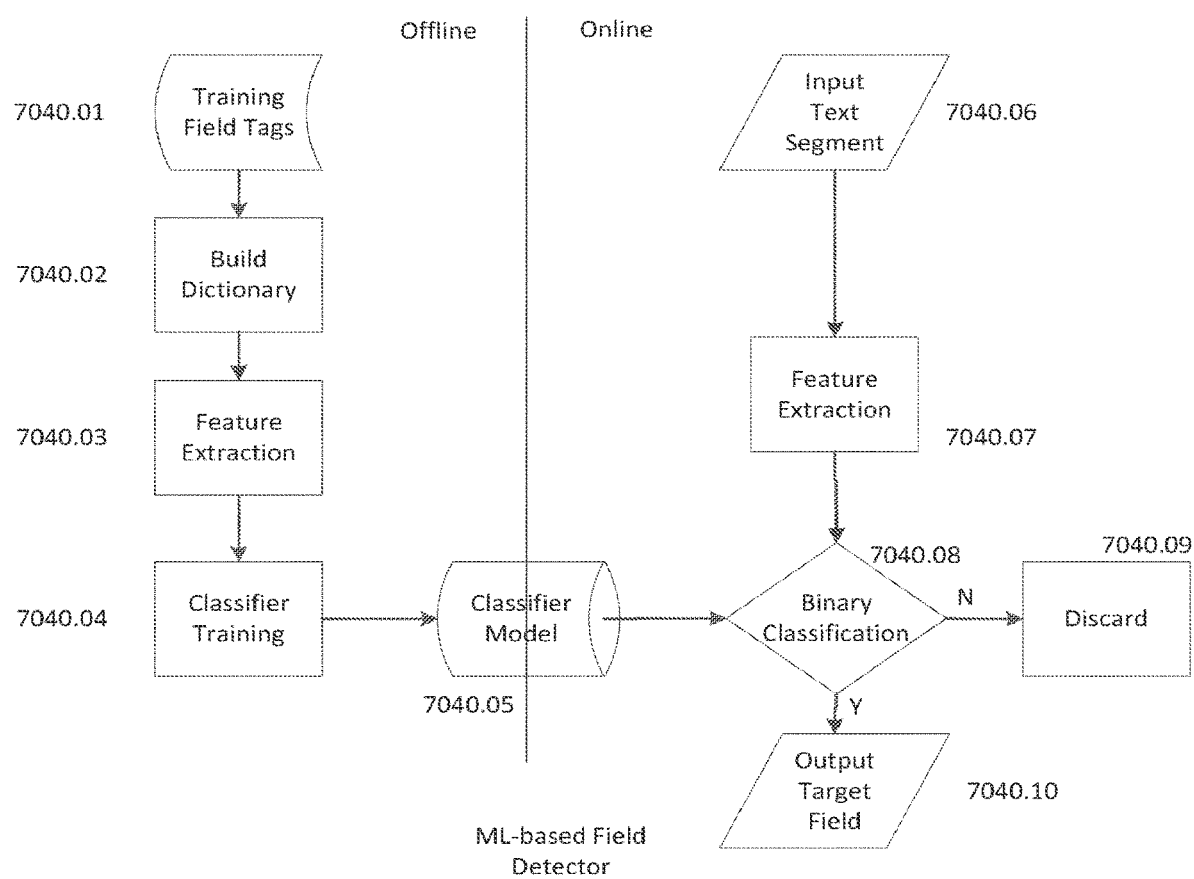
FIG. 17 shows a flowchart of the ML-based field detector that includes an offline training process and an online testing process.

FIG. 17 shows an exemplary embodiment of a machine learning-based field detector. As explained above with respect to FIG. 16, the ML-based field detector is a binary classification based on supervised learning. It includes an offline training procedure and an online testing procedure.

The training procedure requires a training data set that contains both positive samples (text line nodes with field tags) and negative samples (text line nodes without field tags). Based on the training data set, the training procedure creates a classification model. This model is then used by the testing procedure to detect the positive samples.

Specifically, as for the offline training procedure, it takes a training data set that contains both positive and negative samples as input (7040.01). A dictionary is first created based on the lexical properties of this field tag (7040.02). The lexical features are then extracted respectively for each training sample based on this dictionary (7040.03).

Figure 21:
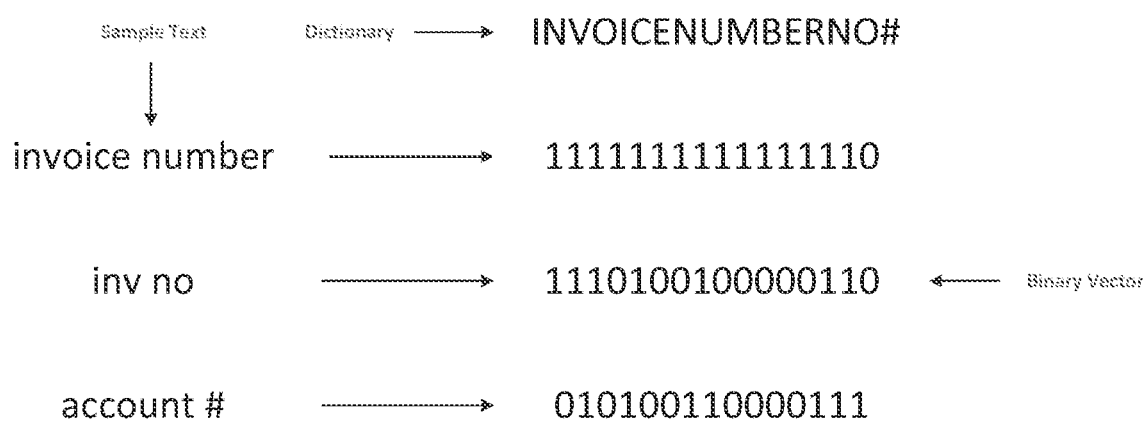
FIG. 21 shows an example of how the binary vector is extracted based on a dictionary.

In order to explain how the features are extracted based on the dictionary, FIG. 21 takes the binary vector as an example which is used in the invoice number detector. The binary vector is a series of binary numbers. The dictionary could be character-wise or word-wise. In this example, the dictionary is character-wise. The length of the binary vector should be equal to the number of the characters in the dictionary. For each character, if it appears in the input sample text, its corresponding binary value should be 1; otherwise, its value should be 0. As shown in FIG. 21, the dictionary is "INVOICENUMBERNO#". The sample text "invoice number" returns a binary vector of "1111111111111110": the sample text "inv no" returns a binary vector of "1110100100000110"; the sample text "account #" returns a binary vector of "010100110000111".

Once the feature is extracted, a classification model is trained based on those features (7040.04), and this model may be saved as a local file (7040.05) or in another persistent storage location that facilitates reloading, such as in a cloud service, a database, and the like. The model file is generated from an offline training process that only runs once, but may be repeatedly used by on the online classification process.

As for the online testing procedure, it takes the text line nodes as the input (7040.06). For each text line node, it extracts the feature vectors based on the text just as the training procedure does (7040.07). Next, the classification model is loaded from the local file (7040.05), takes the feature vector, and performs the binary classification (7040.08). If the current text line node is classified as negative, it will be ignored (7040.09): otherwise, it will be treated as a candidate of this field (7040.10).

Figure 22A:
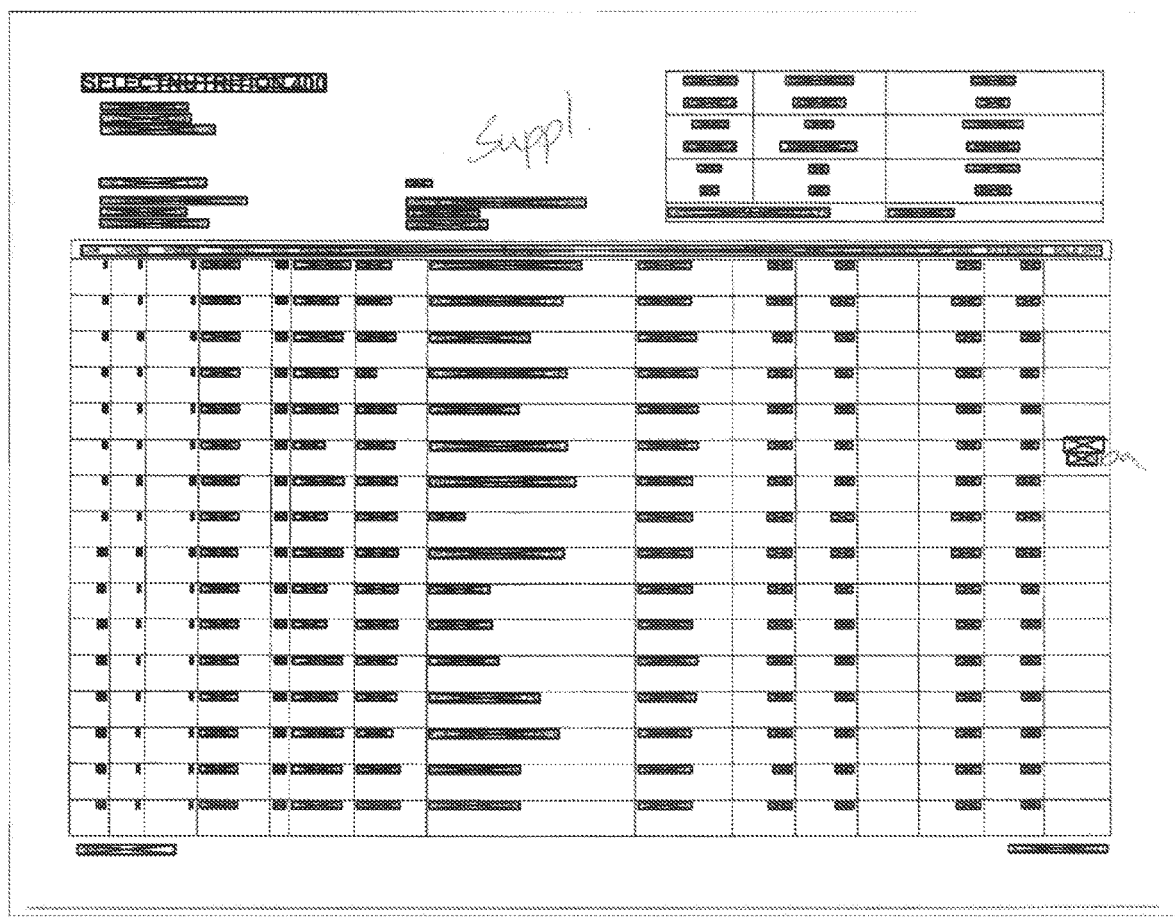
Figure 22B:
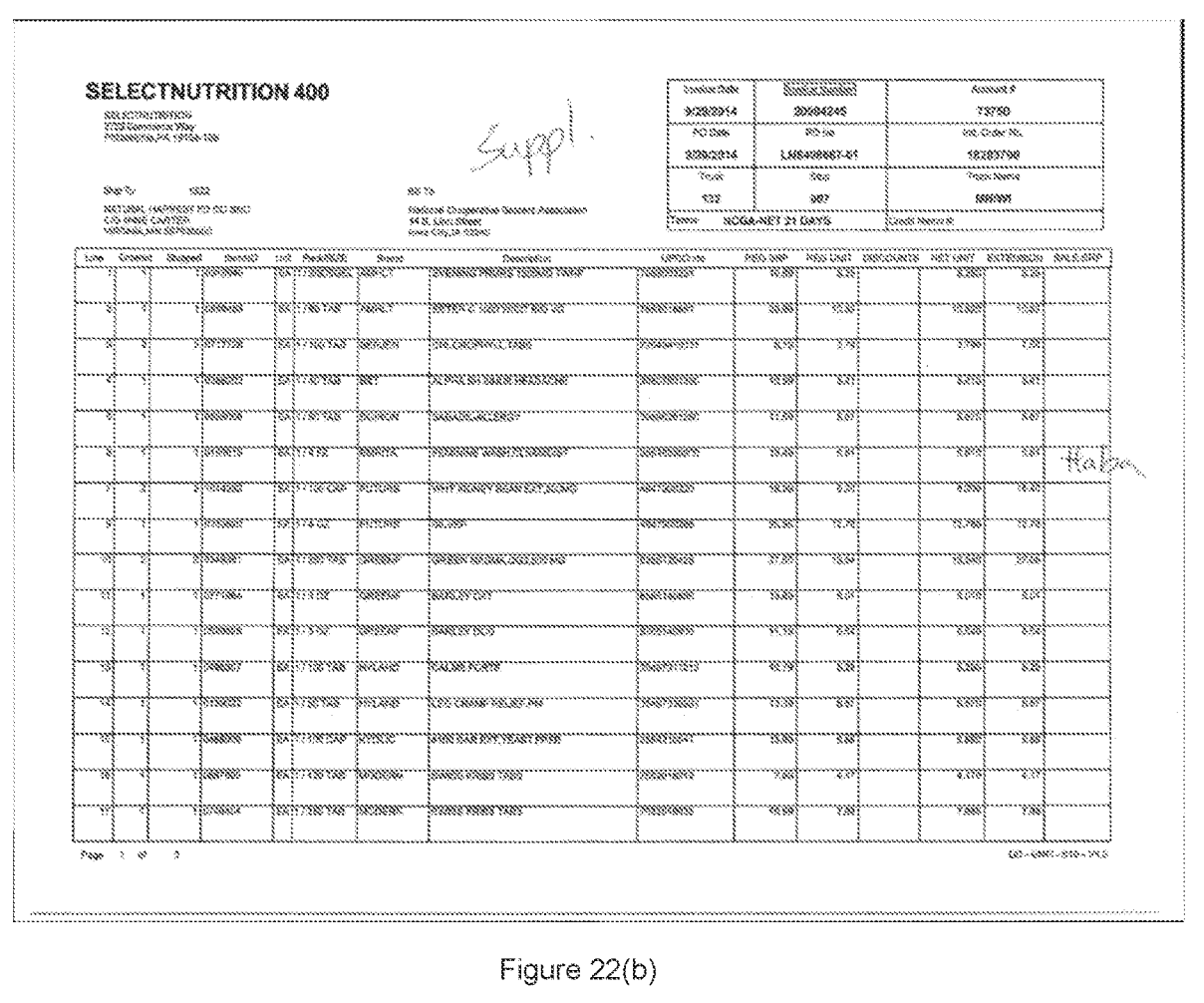

FIG. 22 shows an example of invoice number detection. FIG. 22(*a*) shows all text line nodes inside a document. The invoice number detection will run through those text line nodes and find the ones that contain the invoice number field tag. FIG. 22(*b*) shows the results of the invoice number detection, in which the detected invoice field tag is highlighted with a rectangle.

Content-Based Field Parsing (Steps 8010-8080, FIG. 2)

Figure 18:
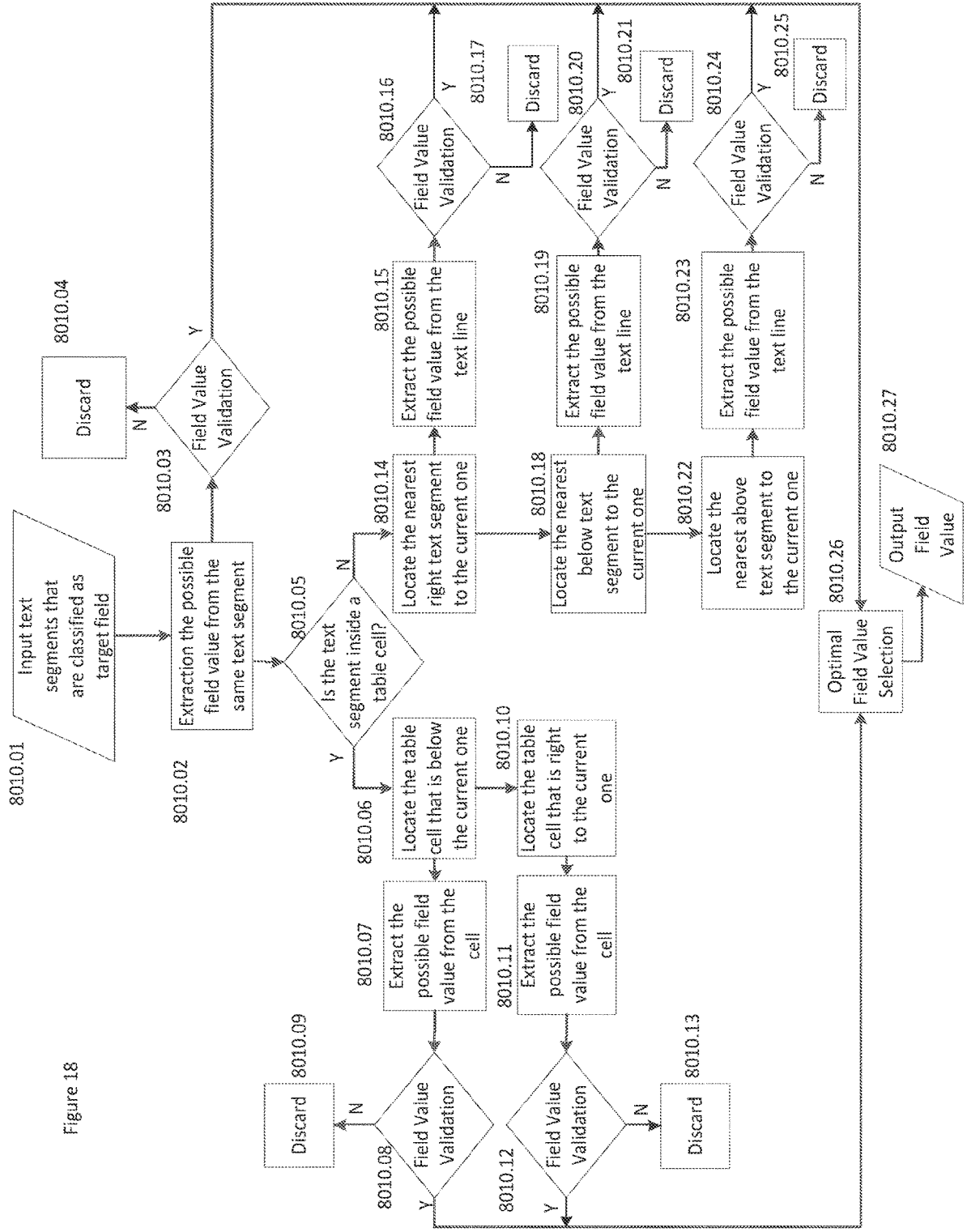
FIG. 18 shows a flowchart of the content-based field parser for those field candidates that are identified from FIG. 16.
Figure 20A:
Figure 20B:
Figure 20D:
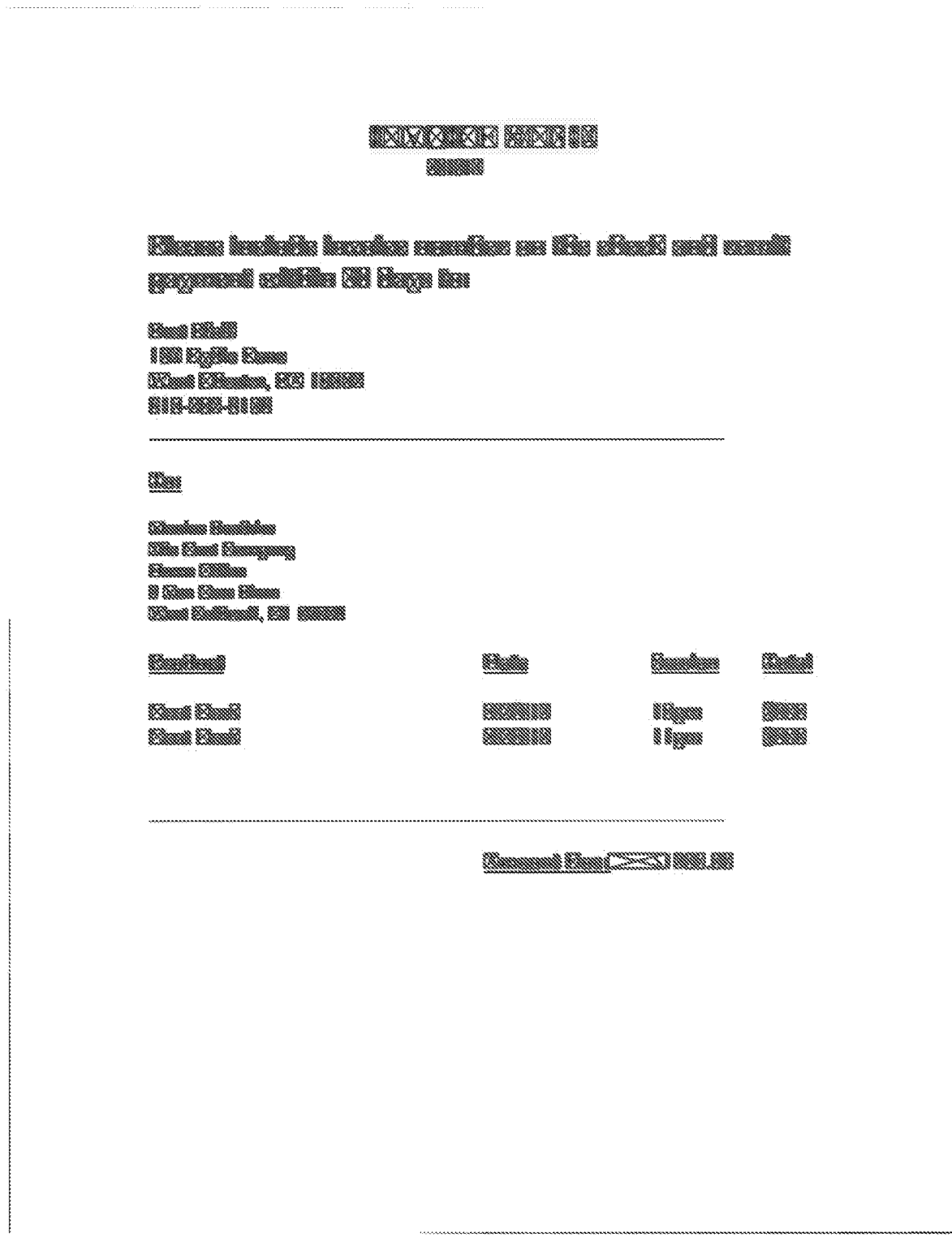
Figure 20E:
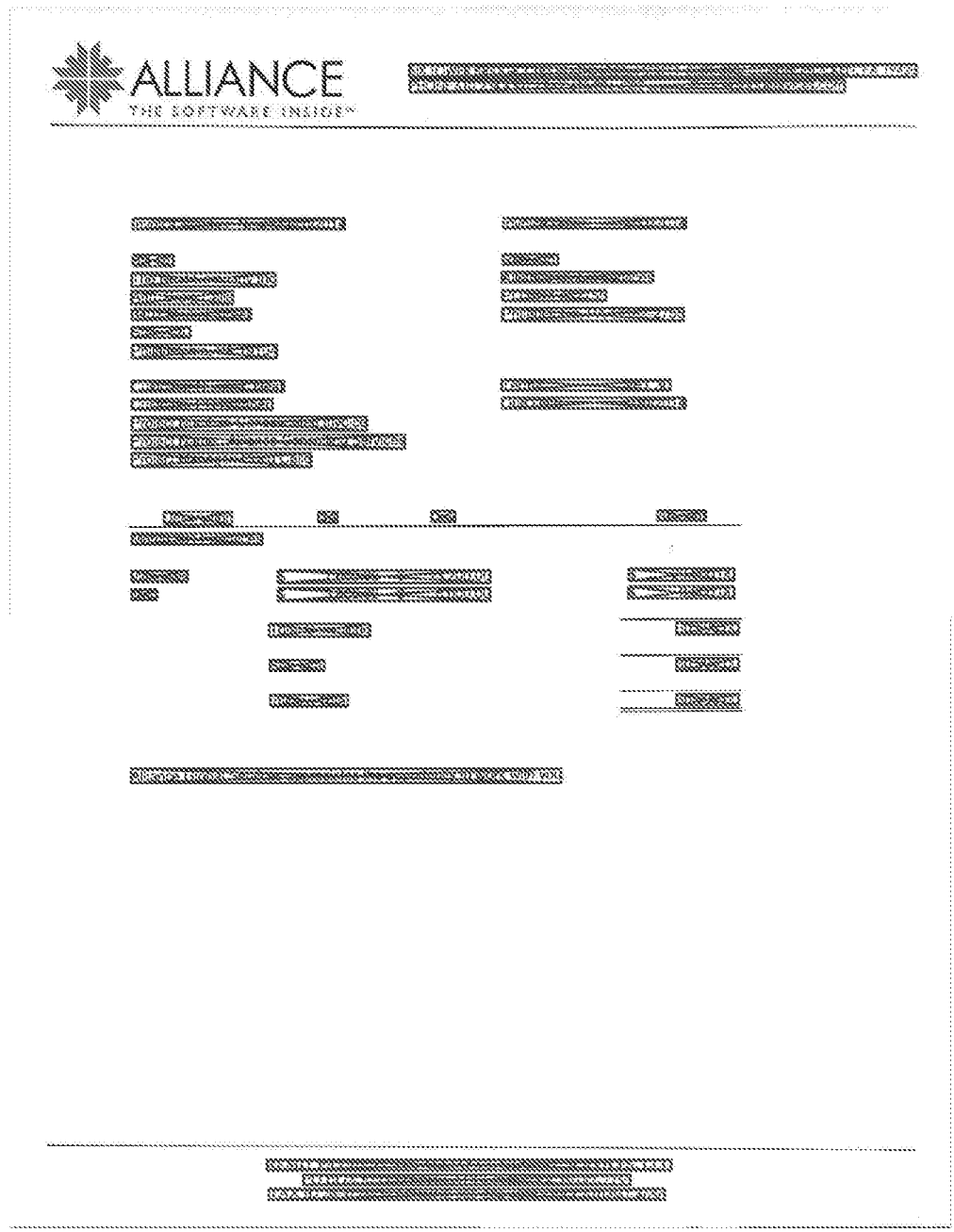

FIG. 18 shows an exemplary embodiment of the content-based field parser. The purpose of the parser is to search the field value around the field tag with the assumption that the field value should be aligned closely to the field tag.

As indicated in FIG. 18, the process takes the text line nodes that are classified as candidates of the current field as the input (8010.01). For each field tag text line node, the process first heuristically searches the possible field value candidates inside this text line node that includes the field tag (8010.02). This is because the field tag and value might be in the same text line, and the value is just aligned right after the tag. If the field value candidate is found, a field value validation will be triggered (8010.03). The field value validation is based on the prior-knowledge about the field value, such as the invoice number, account number and purchase order number that usually contain digits, the invoice date and due date follows the specific date format, the invoice terms usually contain specific keywords, etc. If the field value candidate does not pass the field validation, it will be discarded (8010.04): otherwise, this candidate is treated as a real field value candidate, and is added to a vector of field value candidate.

Next, the process heuristically searches the possible field value candidates around the text line that includes the field tag. There are two different situations that need to be processed differently:

1. The text line that includes the field tag is inside a table; and
2. The text line that includes the field tag is inside a paragraph zone.

Therefore, step 8010.05 checks the container that includes the text line node of field tag. If the type of the container is table cell (FIG. 23(*a*) shows an example of how the field value is searched around the field tag when the tag is inside a table), then:

Heuristically search the possible field value candidate from the table cell below the current one. Specifically, the table cell that is below the current one is first located (8010.06), and then the possible field value candidate is extracted from this cell (8010.07). If the field candidate is found, a field value validation is triggered (8010.08). If the field value candidate does not pass the field validation, it will be discarded (8010.09): otherwise, this candidate is treated as a real field value candidate, and is added to a vector of field value candidate.

Heuristically search the possible field value candidate from the table cell right to the current one. If the field candidate is found, a field value validation is triggered. Specifically, the table cell that is right to the current one is first located (8010.10), and then the possible field value candidate is extracted from this cell (8010.11). If the field candidate is found, a field value validation is triggered (8010.12). If the field value candidate does not pass the field validation, it will be discarded (8010.13); otherwise, this candidate is treated as a real field value candidate, and is added to a vector of field value candidate.

Figure 23A:
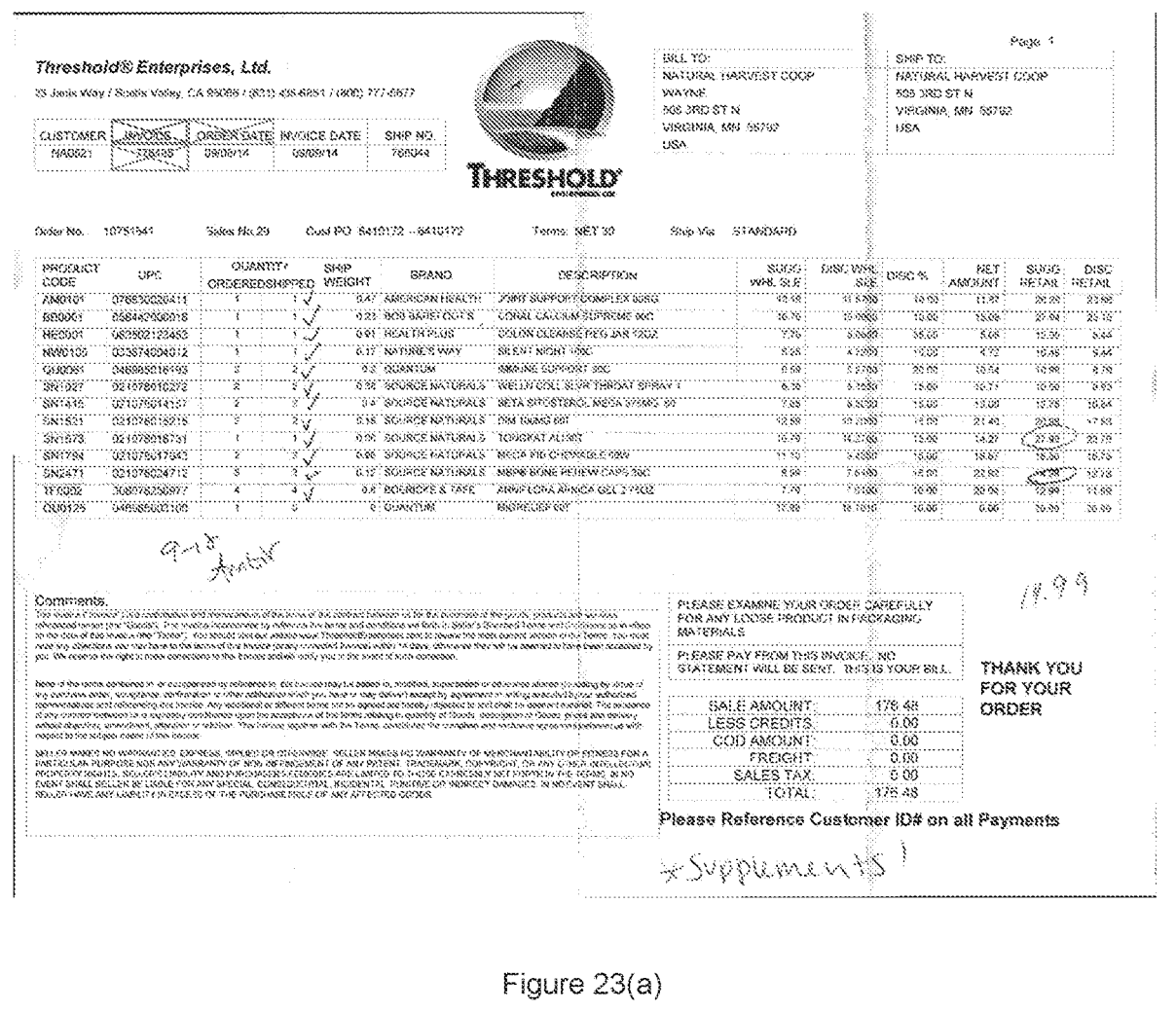
Figure 23B:
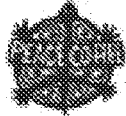

On the other hand, if the type of the container is a paragraph zone (FIG. 23(*b*) shows an example of how the field value is searched around the field tag when the tag is inside a paragraph zone), then:

Heuristically search the possible field value candidate from the nearest right text line to the current one. Specifically, the nearest right text line is first located (8010.14). This text line should meet following conditions:
  It should have enough vertical overlapping with the field tag text line. This is to ensure they are on the same horizontal line.
  Its left coordinate should be bigger than the right coordinate of the field tag text line. This is to ensure it is on the right of the field tag.
  Its horizontal distance to the field tag text line should be the smallest one and less than a threshold. This is to ensure it is the nearest right one.

If this text line is found, the possible field value candidate will be extracted from this text line (8010.15). If the field candidate is found, a field value validation is triggered (8010.16). If the field value candidate does not pass the field validation, it will be discarded (8010.17); otherwise, this candidate is treated as a real field value candidate, and is added to a vector of field value candidate.

Heuristically search the possible field value candidate from the nearest below text line to the current one. Specifically, the nearest below text line is first located (8010.18). This text line should meet following conditions:
  It should have enough horizontal overlapping with the field tag text line. This is to ensure they are on the same vertical line.
  Its top coordinate should be bigger than the bottom coordinate of the field tag text line. This is to ensure it is under the field tag.
  Its vertical distance to the field tag text line should be the smallest one and less than a threshold. This is to ensure it is the nearest below one.

If this text line is found, the possible field value candidate will be extracted from this text line (8010.19). If the field candidate is found, a field value validation is triggered (8010.20). If the field value candidate does not pass the field validation, it will be discarded (8010.21); otherwise, this candidate is treated as a real field value candidate, and is added to a vector of field value candidate.

Heuristically search the possible field value candidate from the nearest above text line to the current one. Specifically, the nearest above text line is first located (8010.22). This text line should meet following conditions:
  It should have enough horizontal overlapping with the field tag text line. This is to ensure they are on the same vertical line.
  Its bottom coordinate should be smaller than the top coordinate of the field tag text line. This is to ensure it is above the field tag.
  Its vertical distance to the field tag text line should be the smallest one and less than a threshold. This is to ensure it is the nearest above one.

If this text line is found, the possible field value candidate will be extracted from this text line (8010.23). If the field candidate is found, a field value validation is triggered (8010.24). If the field value candidate does not pass the field validation, it will be discarded (8010.25); otherwise, this candidate is treated as a real field value candidate, and is added to a vector of field value candidate.

Once the field value candidates are searched around all field tag text lines, a vector of field value candidates is created. Next, an optimal candidate that is most likely to be the field value will be selected based on prior-knowledge (8010.26), such as invoice number usually has more digits than texts, due date is usually later than invoice date, etc. Finally, this process will output a value for this field (8010.27). If no candidate is found from above steps, the field value will be set with an empty string.

Those skilled in the art also will readily appreciate that many additional modifications and scenarios are possible in the exemplary embodiment without materially departing from the novel teachings and advantages of the invention. Accordingly, any such modifications are intended to be included within the scope of this invention as defined by the following exemplary claims.

What is claimed is:

1. A method of detecting and extracting at least one of character and number values in a document field of a received analog or digital financial document, comprising:
  providing the analog or digital financial document as an input image or a PDF input;
  extracting an image layer, when the analog or digital financial document is the PDF input;
  extracting text and character blocks from the input image or the extracted image layer;
  extracting connected components from the input image or the extracted image layer and analyzing the extracted connected components to determine document layout information identifying a structure of the input image or the extracted image layer, the document layout information including character information and non-character information including at least one of barcodes, tables, and logos in said input image or the extracted image layer;

detecting a document field from the document layout information of the input image or the extracted image layer; and parsing the detected document field to extract at least one of character and number values from the extracted text and character blocks of the detected document field of the input image or the extracted image layer.

2. A method as in claim 1, wherein extracting text and character blocks comprises processing the input image or the extracted image layer using optical character recognition (OCR).

3. A method as in claim 1, further comprising enhancing an image quality of the input image or the extracted image layer prior to the analysis to determine the document layout information.

4. The method of claim 3, wherein enhancing the image quality of the input image or the extracted image layer comprises:
rotating and deskewing the input image or the extracted image layer;
cropping the rotated and deskewed input image or the extracted image layer; and
enhancing the background of the input image or the extracted image layer.

5. The method of claim 4, wherein enhancing the background of the input image or the extracted image layer comprises computing a grayscale histogram of the input image or the extracted image layer, searching for a grayscale value with maximum count in said histogram and treating the grayscale value as a median grayscale value of the background.

6. The method of claim 4, wherein enhancing the background of the input image or the extracted image layer comprises generating a grayscale interval originated from said median grayscale value.

7. The method of claim 4, wherein enhancing the background of the input image or the extracted image layer comprises resetting the grayscale value of background pixels of the background if the grayscale value of the background pixels falls outside of the gray scale interval.

8. The method of claim 1, wherein analyzing the input image or the extracted image layer to determine document layout information comprises creating a tree data structure to store the document layout information.

9. The method of claim 1, wherein analyzing the extracted connected components to determine document layout information comprises:
converting the input image or the extracted image layer to a binary image;
extracting connected components from the binary image;
removing noise from the connect components to generated clean connected components;
detecting at least one of barcodes, tables, logos, and characters in said clean connected components;
generating text lines from said characters; and
generating words and paragraph zones from said text lines.

10. The method of claim 9, wherein detecting characters in said connected components comprises collecting all components that are not noise, barcodes, logos, nor table grid lines.

11. The method of claim 9, wherein generating text lines from said characters comprises sorting said characters by their left coordinates.

12. The method of claim 9, wherein generating text lines from said characters comprises identifying whether a character belongs to a text line by:
comparing a height of said character and said text line and determining whether said character belongs to said text line based on a height difference;
computing a vertical overlapping between said character and said text line and determining whether said character belongs to said text line based on an overlapping length; and/or
comparing a horizontal distance between said character and said text line and determining whether said character belongs to said text line based on the horizontal distance.

13. The method of claim 9, wherein generating text lines from said characters comprises combining overlapped text line candidates.

14. The method of claim 9, wherein generating text lines from said characters comprises removing a text line thinner than a threshold from a text line candidate.

15. The method of claim 9, wherein generating words from said text lines comprises estimating a word space from a text line.

16. The method of claim 15, wherein generating words from said text lines comprises identifying whether a character belongs to a word by:
comparing a height of said character and said word and determining whether said character belongs to said word based on a height difference;
comparing a horizontal distance between said character and said word with said estimated word space and determining whether said character belongs to said word;
comparing a height of said character and a character immediately after said character and determining whether said character belongs to said word based on a height difference; and/or
comparing a horizontal distance between said character and a character immediately after said character with said estimated word space and determining whether said character belongs to said word.

17. The method of claim 1, wherein detecting the document field from the document layout information comprises running a text line through a cascade classifier until said text line is matched with one document field or is discarded.

18. The method of claim 1, wherein parsing the detected document field to extract at least one of character and number values from the input image or the extracted image layer comprises applying to the input image or the extracted image layer a series of independent content-based field parsers, each of which corresponds to a document field and parses out a corresponding field value.

19. The method of claim 1, wherein extracting the image layer from the PDF input comprises:
checking a document format to determine when the financial document is the PDF input;
when the financial document is the PDF input, extracting the image layer from the PDF input;
checking a text layer of the PDF input to determine whether the PDF input is searchable or non-searchable; and
extracting the text and character blocks from the PDF input when the PDF input is searchable.

20. The method of claim 19, wherein checking the document format of the PDF input comprises extracting a document extension from a document name and determining the document format from the document extension.

* * * * *